(12) United States Patent
Smith et al.

(10) Patent No.: US 11,134,793 B2
(45) Date of Patent: Oct. 5, 2021

(54) SIDE CARRY HANDLES FOR CHILD CARRIER

(71) Applicant: Dorel Juvenile Group, Inc., Foxboro, MA (US)

(72) Inventors: Abigail K. Smith, Jamaica Plain, MA (US); Jason H. Johnson, Brownstown, IN (US); Devin J. Coakley, Bellingham, MA (US); Dennis Olfers, AV Leende (NL); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 73 days.

(21) Appl. No.: 16/796,359

(22) Filed: Feb. 20, 2020

(65) Prior Publication Data

US 2020/0260884 A1    Aug. 20, 2020

Related U.S. Application Data

(60) Provisional application No. 62/807,966, filed on Feb. 20, 2019, provisional application No. 62/807,961, filed on Feb. 20, 2019.

(51) Int. Cl.
| | |
|---|---|
| *A47D 13/02* | (2006.01) |
| *B60N 2/28* | (2006.01) |
| *B62B 7/14* | (2006.01) |

(52) U.S. Cl.
CPC ......... *A47D 13/025* (2013.01); *B60N 2/2812* (2013.01); *B60N 2/2821* (2013.01); *B60N 2/2845* (2013.01); *B60N 2/2848* (2013.01); *B62B 7/145* (2013.01)

(58) Field of Classification Search
CPC .... A47D 13/025; A47D 13/02; B60N 2/2812; B60N 2/2821; B60N 2/2845; B60N 2/2848; B60N 2/28; B60N 2/2842; B62B 7/145
USPC ......................................... 297/250.1, 256.16
See application file for complete search history.

(56) References Cited

U.S. PATENT DOCUMENTS

| | | | | |
|---|---|---|---|---|
| 5,857,832 A | * | 1/1999 | Al-Temen | A61G 3/062 414/462 |
| 6,179,383 B1 | | 1/2001 | Ochi | |
| 7,445,560 B2 | * | 11/2008 | Greger | A47D 13/102 297/273 |
| 7,658,446 B2 | | 2/2010 | Meeker et al. | |
| 7,740,313 B1 | | 6/2010 | Hei et al. | |
| 7,810,682 B2 | | 10/2010 | Balensiefer et al. | |
| 7,971,933 B2 | | 7/2011 | Tuckey et al. | |
| 8,182,033 B2 | | 5/2012 | Hei et al. | |

(Continued)

FOREIGN PATENT DOCUMENTS

| | | |
|---|---|---|
| DE | 102014103361 B3 | 7/2015 |
| KR | 20130085778 A | 7/2013 |
| WO | 2012162757 A1 | 12/2012 |

OTHER PUBLICATIONS

Extended European Search Report for European Patent App. No. 20168754.8 dated Jun. 22, 20, 5 pages.

*Primary Examiner* — Mark R Wendell
(74) *Attorney, Agent, or Firm* — Barnes & Thornburg LLP

(57) ABSTRACT

A child restraint includes an infant carrier having a carry handle. The infant carrier may be mounted on a stroller frame or on a vehicle seat or may be carried by a caregiver after separation from the stroller frame or vehicle seat.

21 Claims, 14 Drawing Sheets

(56) References Cited

U.S. PATENT DOCUMENTS

| | | |
|---|---|---|
| 8,214,950 B2 | 7/2012 | Topaz et al. |
| 8,393,505 B2 | 3/2013 | Coote |
| 8,550,548 B2 | 10/2013 | Gibbons et al. |
| 8,684,454 B2 | 4/2014 | Chipman et al. |
| 8,702,169 B2 | 4/2014 | Abadilla et al. |
| 8,845,028 B2 | 9/2014 | Miller |
| 8,864,166 B2 | 10/2014 | Longenecker et al. |
| 8,960,794 B2 | 2/2015 | St. Pierre |
| 9,066,609 B2 | 6/2015 | Starr et al. |
| 9,271,580 B2 | 3/2016 | Beekman |
| 9,326,619 B2 | 5/2016 | Krass |
| 9,357,852 B2 | 6/2016 | Salazar et al. |
| 9,510,694 B2 | 12/2016 | Hozer et al. |
| 9,637,153 B2 | 5/2017 | Sclare |
| 9,681,758 B2 | 6/2017 | Lau |
| 9,687,083 B1 | 6/2017 | Romero |
| 9,743,778 B2 | 8/2017 | Garritt |
| 9,771,006 B2 | 9/2017 | Forbes |
| 9,918,561 B2 | 3/2018 | Perrin et al. |
| 9,943,457 B2 | 4/2018 | Starr |
| 10,028,592 B1 | 7/2018 | Ruiz |
| 10,070,738 B1 | 9/2018 | Royalty |
| 11,034,266 B2 * | 6/2021 | Heisey ............... B60N 2/2821 |
| 2008/0313812 A1 * | 12/2008 | Reeves ............... B60N 2/2845 |
| | | 5/655 |
| 2009/0114691 A1 * | 5/2009 | Bizzell ............... A47D 13/02 |
| | | 224/577 |
| 2014/0296045 A1 | 10/2014 | Krstanoski-Blazeski |
| 2018/0008057 A1 | 1/2018 | Salinson |
| 2018/0056823 A1 * | 3/2018 | Anderson ........... B60N 2/2806 |
| 2018/0056824 A1 * | 3/2018 | Anderson ........... B60N 2/4235 |
| 2018/0220808 A1 | 8/2018 | Anderson et al. |
| 2019/0038044 A1 | 2/2019 | Cummings |
| 2019/0281995 A1 | 9/2019 | Troutman et al. |

* cited by examiner

SIDE CARRY HANDLES FOR CHILD CARRIER

PRIORITY CLAIM

This application claims priority to US Provisional Application Nos. 62/807,966, filed Feb. 20, 2019, and 62/807,961, filed Feb. 20, 2019, which applications are hereby incorporated by reference herein.

BACKGROUND

The present disclosure relates to a child restraint and particularly to an infant carrier, more particularly, the present disclosure relates to an infant carrier including side carrier handles.

SUMMARY

According to the present disclosure, a child restraint includes a seating bucket adapted to carry a child and first and second side carry handles coupled to the seating bucket. In illustrative embodiments, the seating bucket and the carry handles are included in an infant excursion seat that can be anchored by a caregiver to a rigid seat shell of an excursion-seat carrier that has its own pivotable shell carry handle. Alternatively, the infant excursion seat can be carried about by a caregiver using the side carry handles after the infant excursion seat has been separated from the rigid seat shell of the excursion-seat carrier.

In illustrative embodiments, each side carry handle of the infant excursion seat includes a hand grip, a head-end grip tether interconnecting an upper end of the hand grip to a head end of the seating bucket that is configured to hold the head of an infant carried in the seating bucket, and a foot-end grip tether interconnecting a lower end of the hand grip to a foot end of the seating bucket that is configured to hold the feet of an infant carried in the seating bucket. The foot-end grip tether is configured in accordance with the present disclosure to retract the hand grip automatically from a RAISED BUCKET-CARRYING position above the seating bucket to a LOWERED STORAGE position alongside the seating bucket as soon as the caregiver releases the hand grip.

In illustrative embodiments, the foot-end grip tether includes a movable strap segment having an anchored outer end coupled to the lower end of the hand grip and passing through a tether-receiving aperture formed in the seating bucket. The foot-end grip tether further includes extensible means for yieldably and automatically pulling the movable strap segment through the tether-receiving aperture formed in the seating bucket to move the handgrip from the RAISED BUCKET-CARRYING position toward the foot end of the seating bucket to reach the LOWERED STORAGE position alongside the foot end of the seating bucket in response to release of the hand grip by a person that is transporting the seating bucket by holding the hand grip in the RAISED BUCKET-CARRYING position so that the hand grip normally remains in the LOWERED STORAGE position until a caregiver moves the hand grip upwardly toward the RAISED BUCKET-CARRYING position.

In illustrative embodiments, the extensible means of the foot-end grip tether includes a movable slide that is mounted for movement on the movable strap segment so as to locate the tether-receiving aperture that is formed in the seating bucket between the hand grip and the movable slide. The extensible means further includes an elastic strap having an inner end coupled to the movable slide and an outer end coupled to the foot end of the seating bucket at a first anchor point. The movable strap segment further includes an inner end coupled to the foot end of the seating bucket at a second anchor point that is spaced apart from the first anchor point. The movable slide and the elastic strap are located in a hollow region formed in the foot end of the seating bucket so as not to be visible to a caregiver using the infant excursion seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
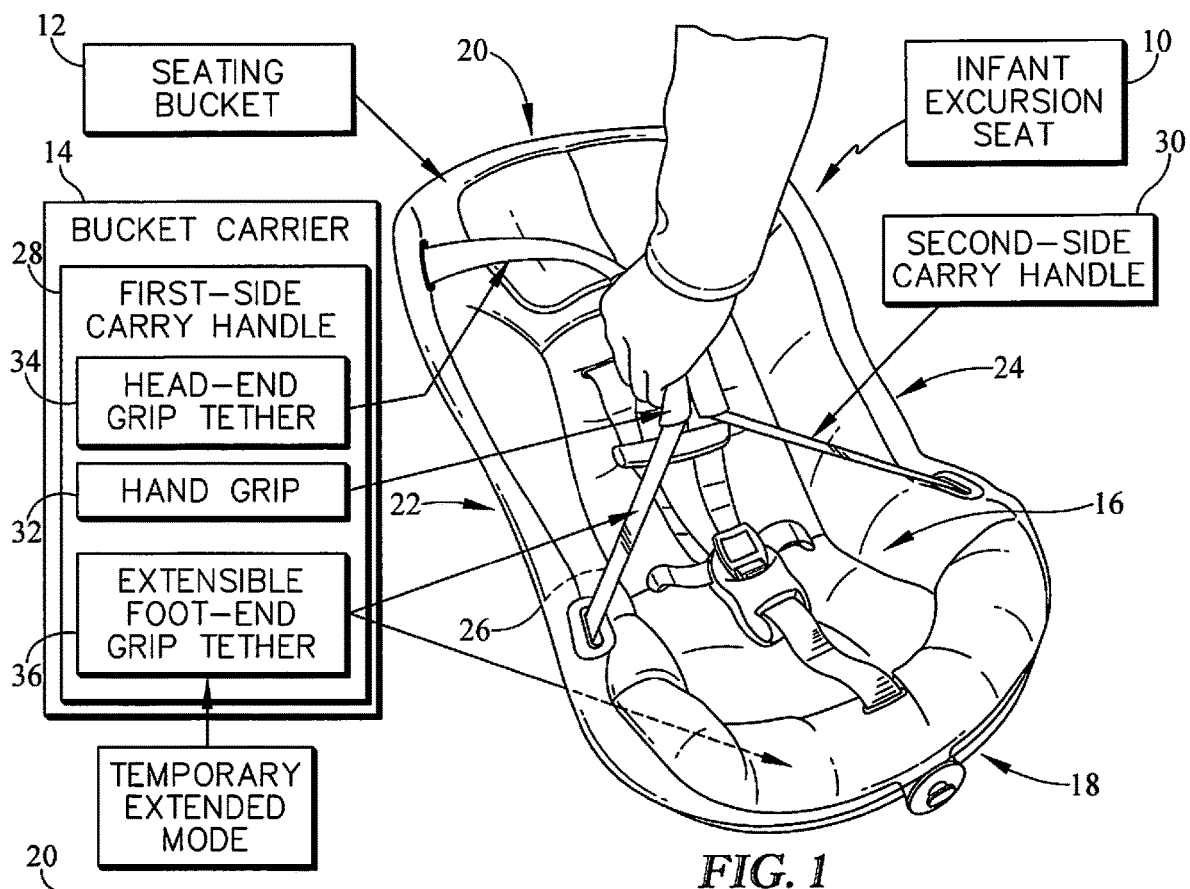
FIG. 1 is a perspective view of an infant excursion seat that can be mounted or carried and is configured in accordance with the present disclosure to be (1) mounted in an excursion-seat carrier comprising a shell carry handle and a rigid seat shell that is adapted to hold the infant excursion seat and be anchored either to a stroller frame or in place on a vehicle passenger seat or a carrier-mount base that is anchored to a vehicle passenger seat as suggested in FIG. 3-5 or (2) carried by a caregiver as suggested in FIG. 1 after the infant excursion seat has been separated from a mounted position in the companion rigid seat shell of the excursion-seat carrier and showing that the infant excursion seat includes a mobile seating bucket and a bucket carrier configured to include first and second side carry handles and suggesting that each side carry handle includes a hand grip, a head-end grip tether coupled to the head end of the seating bucket, and an extensible foot-end grip tether and also suggesting that the extensible foot-end grip tether is arranged in accordance with the present disclosure to extend through a companion tether-receiving aperture formed in the seating bucket for sliding movement therein during a mode change of the extensible foot-end grip tether from a NORMAL CONTRACTED mode shown in FIGS. 2-4, 7, and 9 to a TEMPORARY EXTENDED mode shown in FIGS. 1, 6, and 8 in response to an upward tugging force applied by the caregiver to the hand grips as the caregiver picks up the infant excursion seat using the side carry handles.
Figure 3:
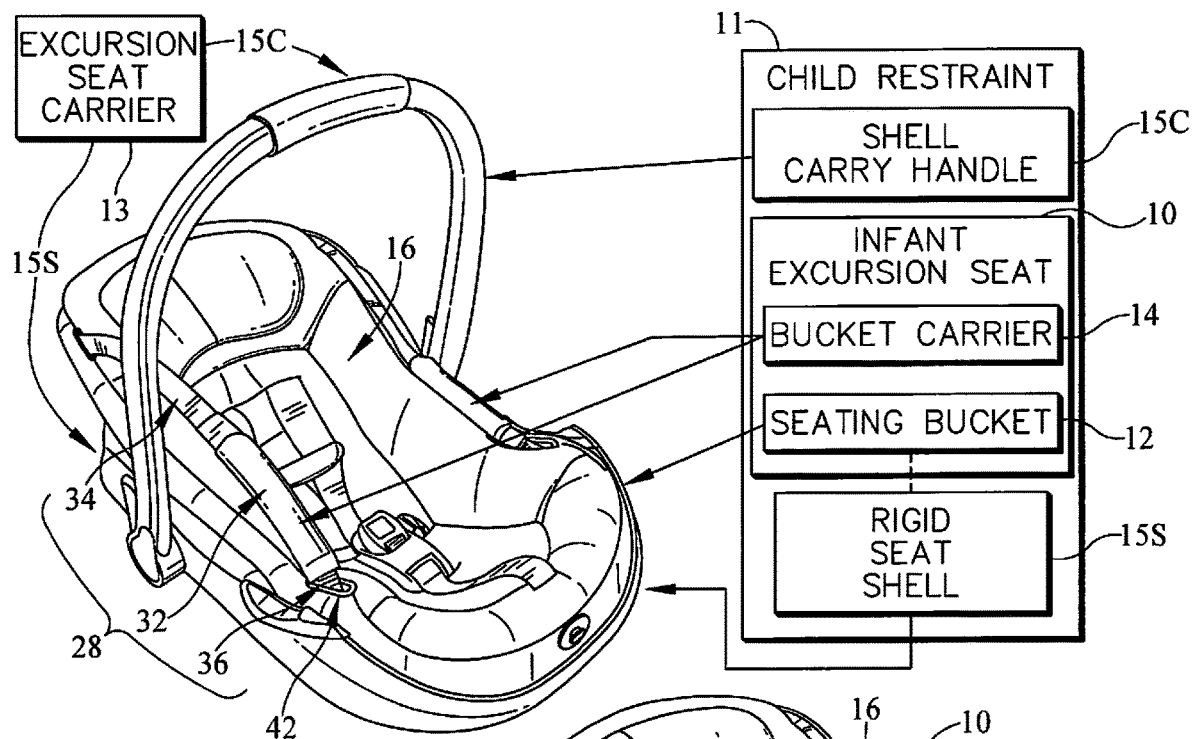
FIG. 3 is a perspective view of a child restraint in accordance with the present disclosure comprising the infant excursion seat of FIGS. 1 and 2 mounted in an a rigid seat shell of an excursion-seat carrier and showing that the excursion-seat carrier also includes a carry handle mounted for pivotable movement on the rigid seat shell between an upwardly extending USE position as shown in FIG. 3 and a rearwardly extending INACTIVE position as shown in FIGS. 4 and 5.
Figure 4:
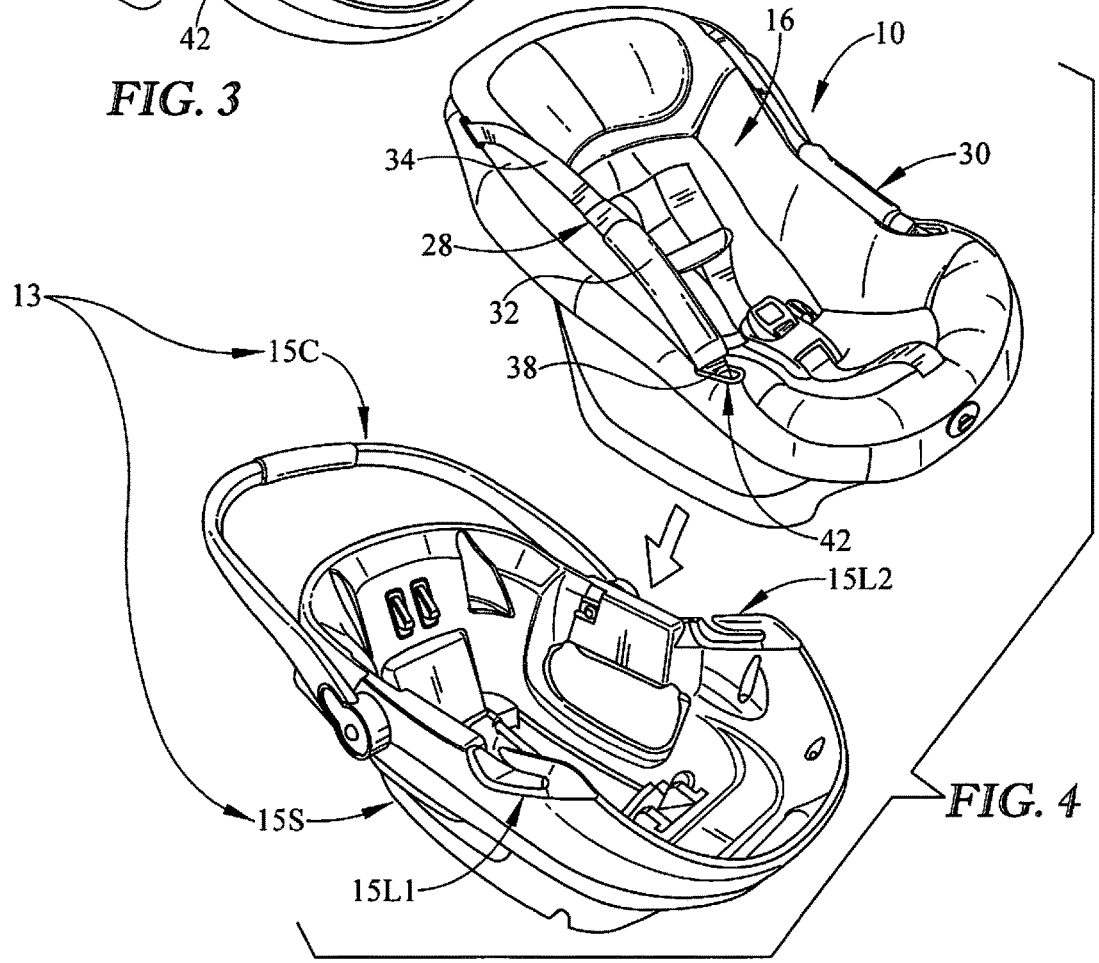
FIG. 4 is an exploded perspective assembly view showing lowering of the infant excursion seat of FIG. 2 into the rigid seat shell of the excursion-seat carrier while the carry handles of the excursion-seat carrier lie in the INACTIVE positions.
Figure 5:
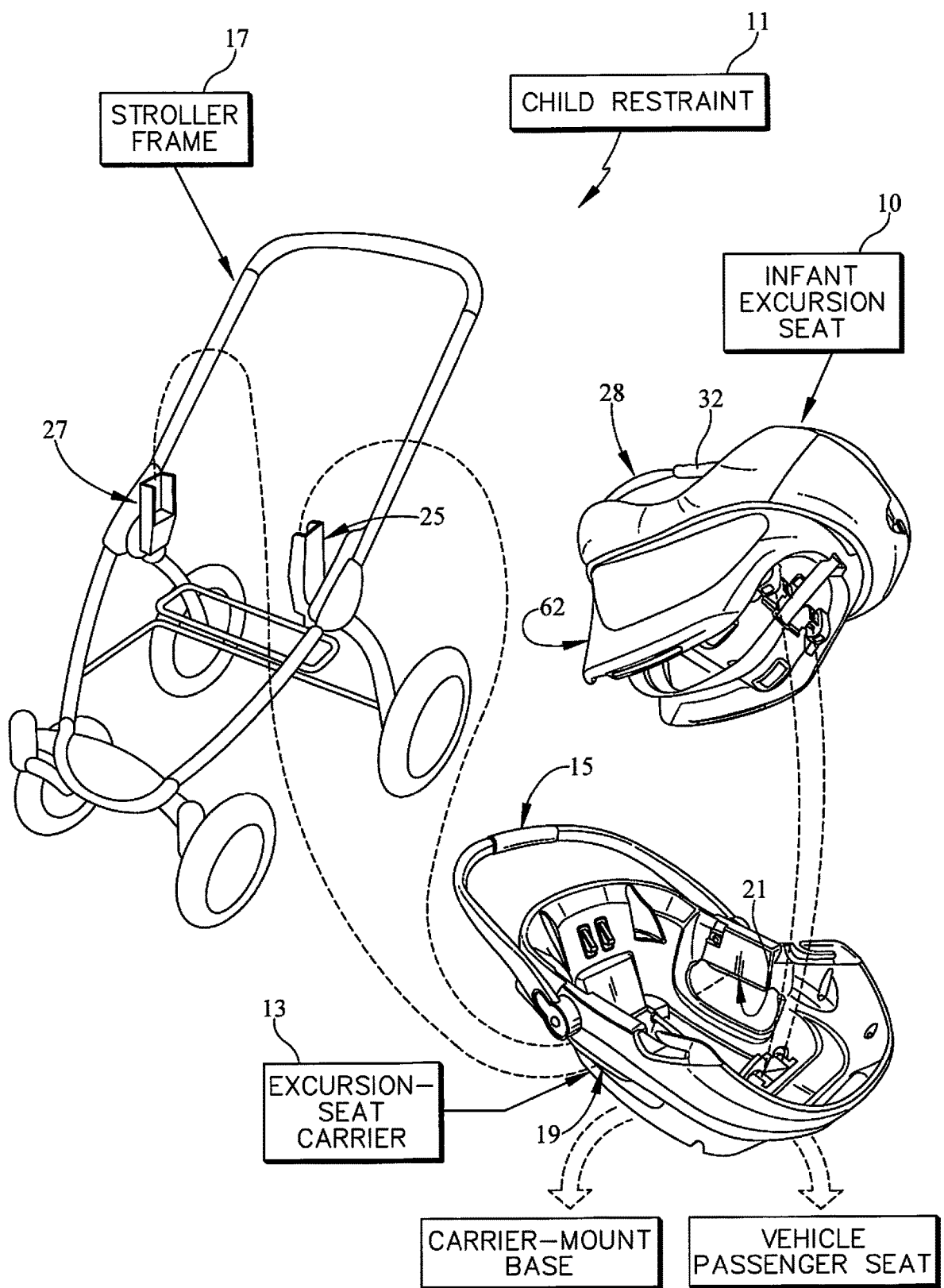
FIG. 5 is a perspective view of a child restraint system in accordance with the present disclosure showing that the child restraint system includes an infant excursion seat having a seating bucket and bucket carrier of the type shown in FIGS. 1 and 2 and may also include (1) an excursion-seat carrier that includes a pivotable shell carry handle and a rigid (bucket-support) seat shell formed to include an upwardly opening chamber for receiving the seating bucket of the infant excursion seat as suggested in FIGS. 3 and 4 and (2) a stroller frame and (3) a carrier-mount base adapted to be anchored to a vehicle passenger seat, and suggesting that a caregiver may elect to mount the infant excursion seat in the upwardly-opening chamber formed in the excursion-seat carrier or carry the infant-excursion seat after it has been separated from the excursion-seat carrier and suggesting that the excursion-seat carrier is adapted in accordance with the present disclosure to be retained in a stationary position on an underlying vehicle passenger seat or mounted in a separate carrier-support base that is adapted to be retained in a stationary position on an underlying vehicle passenger seat.

An infant excursion seat 10, 210, and 310 in accordance with the present disclosure can be carried by a caregiver, as shown in FIG. 1, or mounted on a stroller frame or an excursion-seat carrier, as suggested in FIGS. 4 and 5. The excursion-seat carrier can hold the infant excursion seat and be carried using its own pivotable carry handle or can be anchored in place on a vehicle passenger seat directly or can be mounted in a carrier-mount base that is anchored to a vehicle passenger seat as suggested in FIGS. 3-5.

An infant excursion seat 10 in accordance with a first embodiment of the present disclosure is shown in FIGS. 1-11. An infant excursion seat 210 in accordance with a second embodiment is shown in FIGS. 12-17 while an infant excursion seat 310 in accordance with a third embodiment is shown in FIGS. 18-25.

Figure 12:
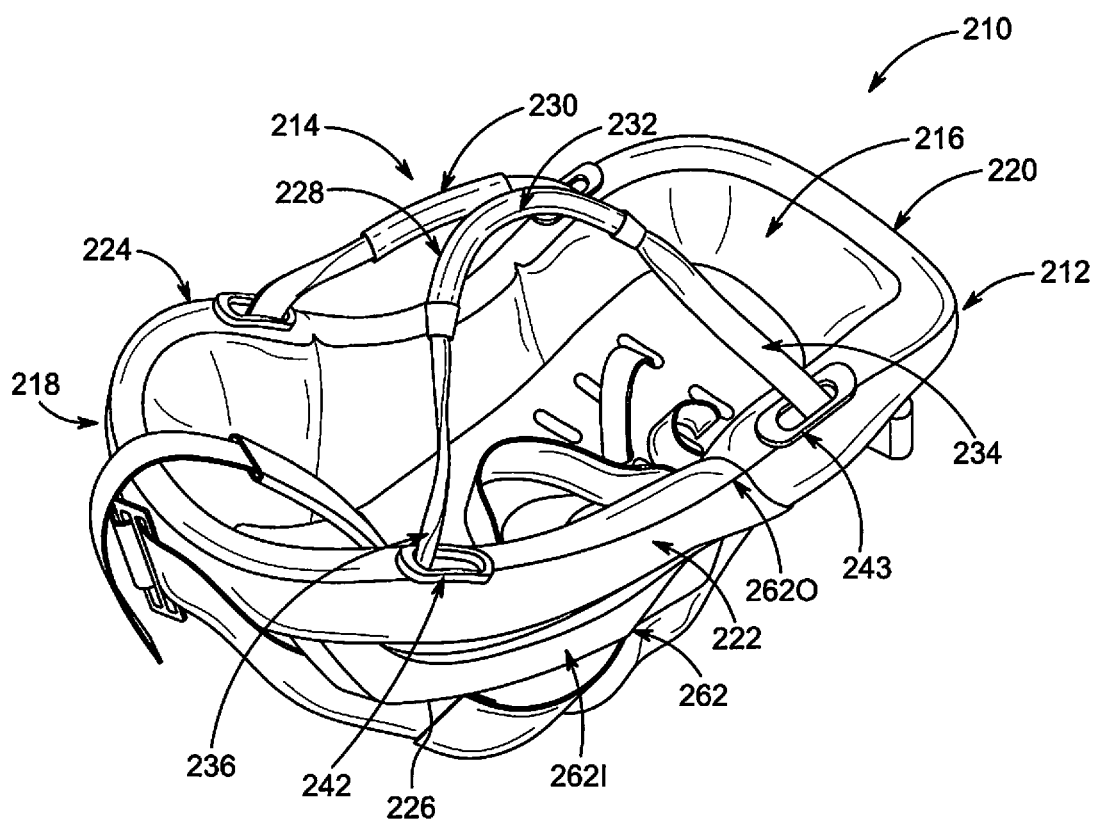
FIG. 12 is a perspective view of an infant excursion seat in accordance with a second embodiment of the present disclosure and showing that the infant excursion seat includes first and second side carry handles that are retractable from a RAISED BUCKET-CARRYING position in a TEMPORARY EXTENDED mode to a LOWERED STORAGE position as shown in FIG. 13.
Figure 20:
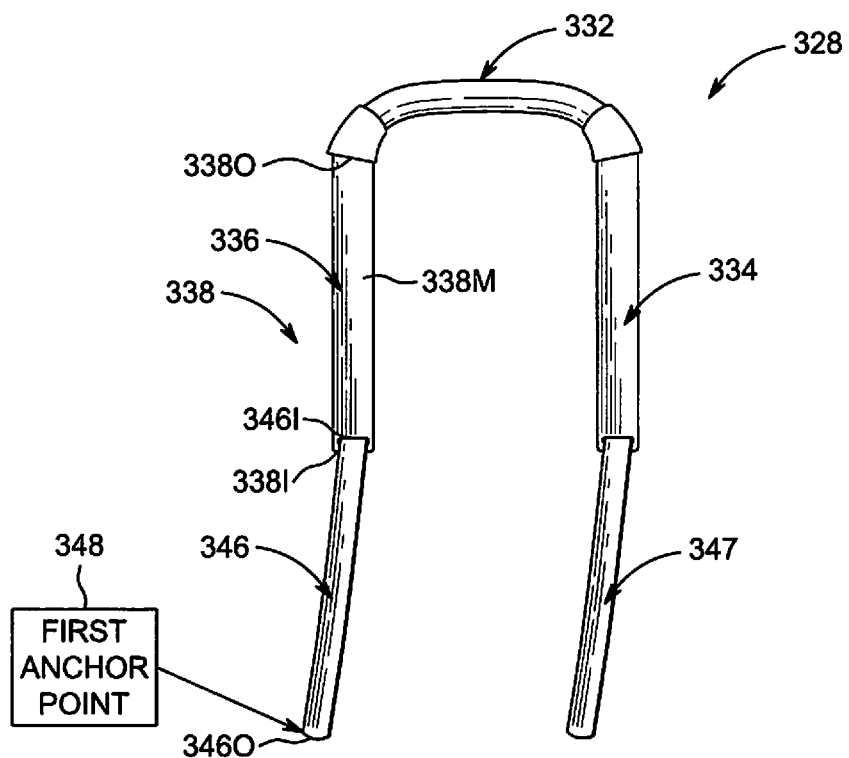
FIG. 20 is an enlarged view of the first side-carry handle.

Each of infant excursion seats 10, 210, and 310 includes a seating bucket 12 for holding an infant and first and second side carry handles that are coupled to the seating bucket 12 and are gripped by a caregiver to transport each of the infant excursion seats 10, 210, 310 after separation from a companion stroller frame or excursion-seat carrier or from a vehicle passenger seat as shown in FIGS. 1, 12, and 20. Each infant excursion seat includes a hand grip in each of the first and second side carry handles and an extensible grip tether that yieldably and automatically moves its companion hand grip of each carry handle normally to a LOWERED STORAGE position alongside the seating bucket 12 and frees the companion hand grips to be moved by a caregiver upwardly away from the seating bucket 12 from the LOWERED STORAGE position to a RAISED BUCKET-CARRYING position so that the caregiver can grip both hand grips in one hand and carry the infant in the seating bucket 12.

Figure 2:
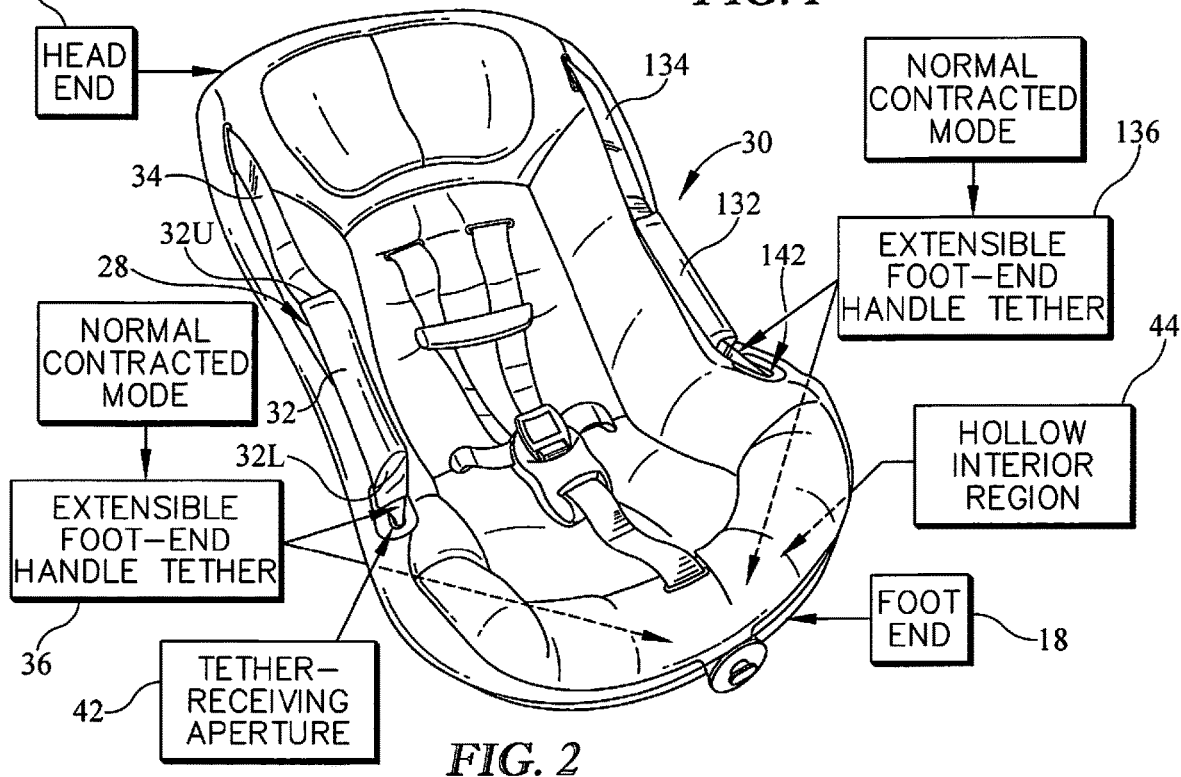
FIG. 2 is a view similar to FIG. 1 showing that a change in mode has taken place in response to release of the hand grips of the first and second side carry handles by a caregiver to cause the extensible foot-end grip tether in each of the first and second side carry handles of the infant excursion seat to retract into a hollow region formed in the foot end of the seating bucket to assume their NORMAL CONTRACTED mode so that each of the hand grips move automatically relative to the seating bucket from a RAISED BUCKET-CARRYING position in the TEMPORARY EXTENDED mode of the extensible foot-end grip tethers as shown in FIG. 1 to a LOWERED STORAGE position in the NORMAL CONTRACTED mode of the extensible foot-end tethers as shown in FIG. 2.

A child restraint 11 in accordance with a first embodiment of the present disclosure comprises an infant excursion seat 10 including a seating bucket 12 and a bucket carrier 14 as shown in FIGS. 1 and 2. Seating bucket 12 is formed to include an interior child-carrying space 16. Seating bucket 12 includes a foot end 18, an opposite head end 20, a first side wall 22 extending between the foot and head ends 18, 20, and a second side wall 24 extending between the foot and head ends 18, 20 and lying in spaced-apart relation to the first side wall 22 to locate the interior child-carrying space 16 therebetween. Seating bucket 12 also includes a floor 26 coupled to each of walls 22, 24 and ends 18, 20. Bucket carrier 14 includes a first side carry handle 28 associated with first side wall 22 of seating bucket 12 and a second side carry handle 30 associated with second side wall 24 of seating bucket 12.

First side carry handle 28 includes a first hand grip 32, a head-end grip tether 34, and a foot-end grip tether 36 as shown in FIGS. 1 and 2. First hand grip 32 is arranged to be gripped and moved relative to seating bucket 12 by a person carrying seating bucket 12 from a LOWERED STORAGE position located in close proximity to foot end 18 of seating bucket 12 to a RAISED BUCKET-CARRYING position that is located above a mid-section of first side wall 22 and between the foot and head ends of seating bucket 12. First hand grip 32 includes an upper end 32U facing toward the head end 20 of seating bucket 12 and a lower end 32L facing toward foot end 18 of seating bucket 12. Head-end grip tether 34 is arranged to interconnect the upper end 32U of the first hand grip 32 and the head end 20 of seating bucket 12. Foot-end grip tether 36 is arranged to interconnect the lower end 32L of the first hand grip 32 and the foot end 18 of the seating bucket 12.

Child restraint 11 in the illustrative embodiment further includes an excursion-seat carrier 13 as shown in FIGS. 3 and 4. The excursion-seat carrier 13 includes a rigid seat shell 15S and a pivotable shell carry handle 15C mounted on the rigid seat shell 15S. Infant excursion seat 10 may be mounted on rigid seat shell 15S excursion-seat carrier 13 while transporting child restraint 11 and a child seating in interior child-carrying space 16 in a vehicle. Rigid seat shell 15S is secured to a vehicle passenger seat using seat belt lock-offs 15L1 and 15L2 as shown in FIG. 4. Excursion-seat carrier 13 is configured to provide increase support for securing infant excursion seat 10 in the vehicle and greater protection for the child seated in interior child-carrying space 16. Excursion-seat carrier 13 is adapted to be retained in a stationary position on an underlying vehicle passenger seat or mounted in a separate carrier-support base that is adapted to be retained in a stationary position on an underlying vehicle passenger seat as suggested in FIG. 5.

Shell carry handle 15 may be grasped by a caregiver to carry both excursion-seat carrier 13 and infant excursion seat 10. A caregiver may transport child restraint 11 using shell carry handle 15 to a stroller frame 17 or to a vehicle passenger seat or a carrier-mount based on a vehicle passenger seat as suggested in FIG. 5. Bucket support shell 13 includes first and second stroller mounts 19, 21 that may be mounted on companion mount posts 23, 25 coupled to stroller frame 17 or to a vehicle passenger seat or a carrier-mount based on a vehicle passenger seat.

Figure 6:
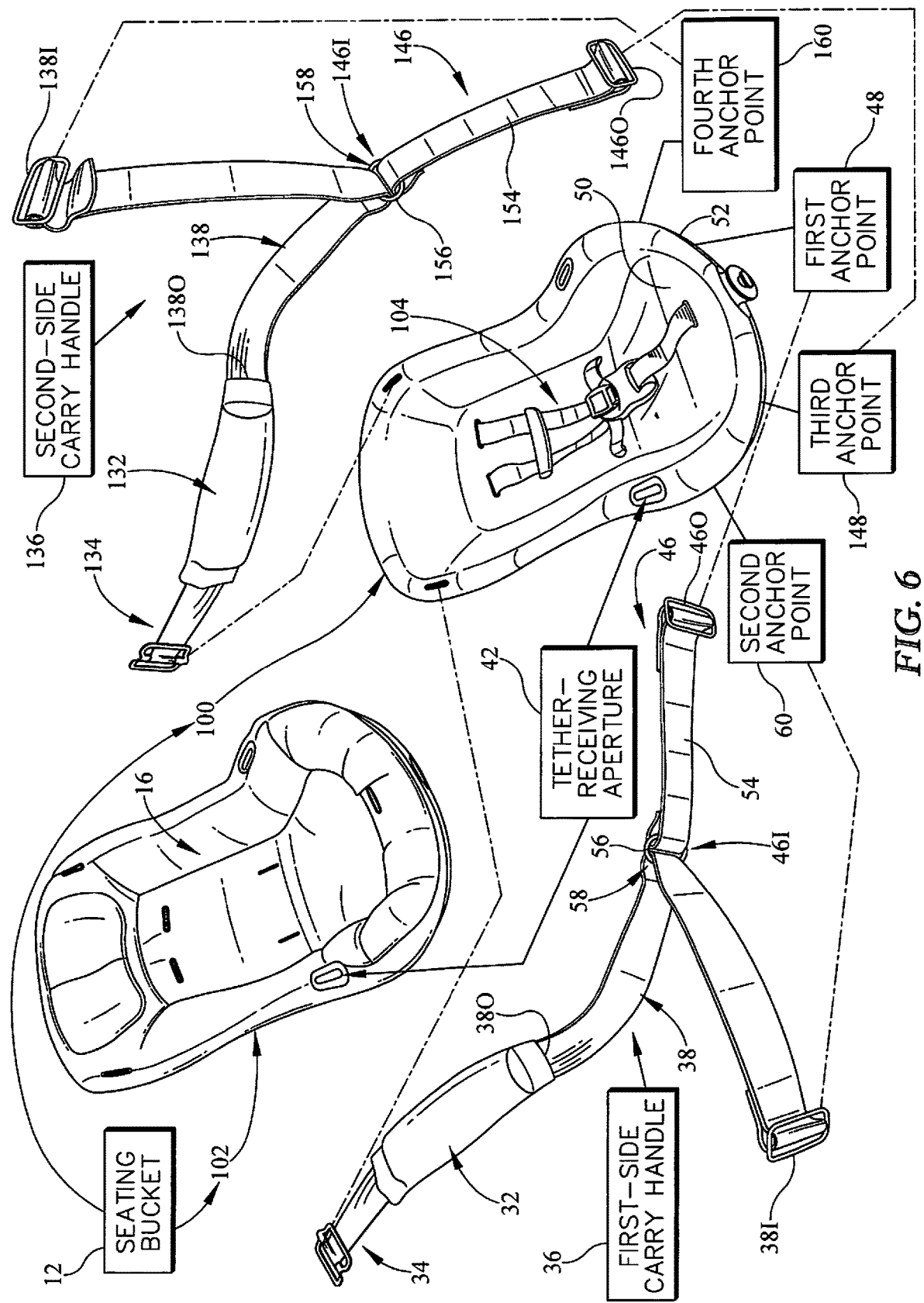
FIG. 6 is an exploded perspective assembly view of components included in the infant excursion seat.

Seating bucket 12 includes a bucket shell 100, a bucket cover 102, and a child-restraint harness 104 as shown in FIG. 6. The bucket shell 100 is made from plastics material to support a child. The bucket cover 102 is arranged to cover the bucket shell 100 to increase comfort for the child resting in the child-carrying region 16. The child-restraint harness 104 includes a plurality of straps that secure the child to the bucket shell 100 in the child-carrying region 16. The receiving-aperture 42 is formed in both the bucket shell 100 and the bucket cover 102 such that the foot-end grip tether 36 extends therethrough.

Figure 7:
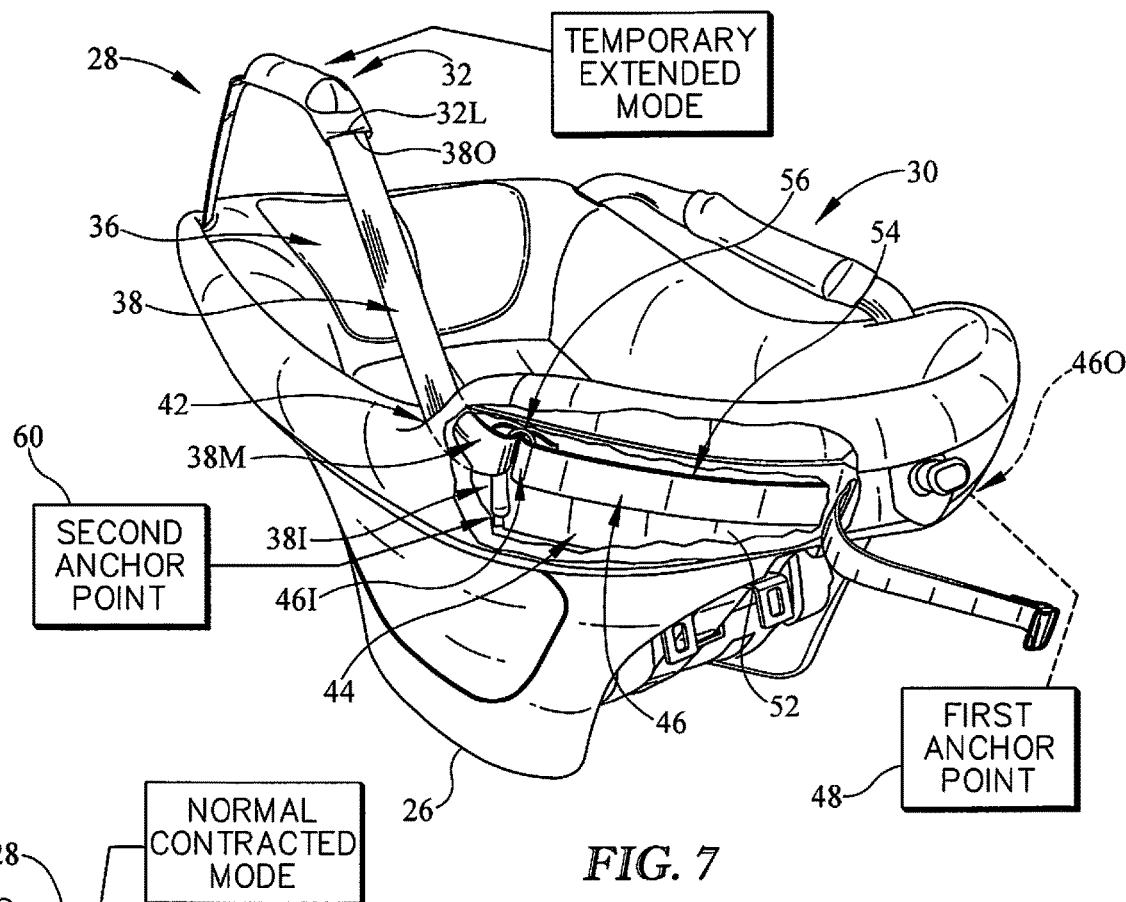
FIG. 7 is a perspective view of the infant excursion seat of FIG. 1 in which the extensible foot-end grip tether is shown in the TEMPORARY EXTENDED mode to cause the companion hand grip of the first side carry handle to be moved upwardly relative to the seating bucket to assume the RAISED BUCKET-CARRYING position, with a portion of the seating bucket removed to show portions of the extension foot-end grip tether of the first side carry handle that are normally hidden from view in a hollow chamber formed in the foot-end of the seating bucket while that tether is in the TEMPORARY EXTENDED mode.
Figure 8:
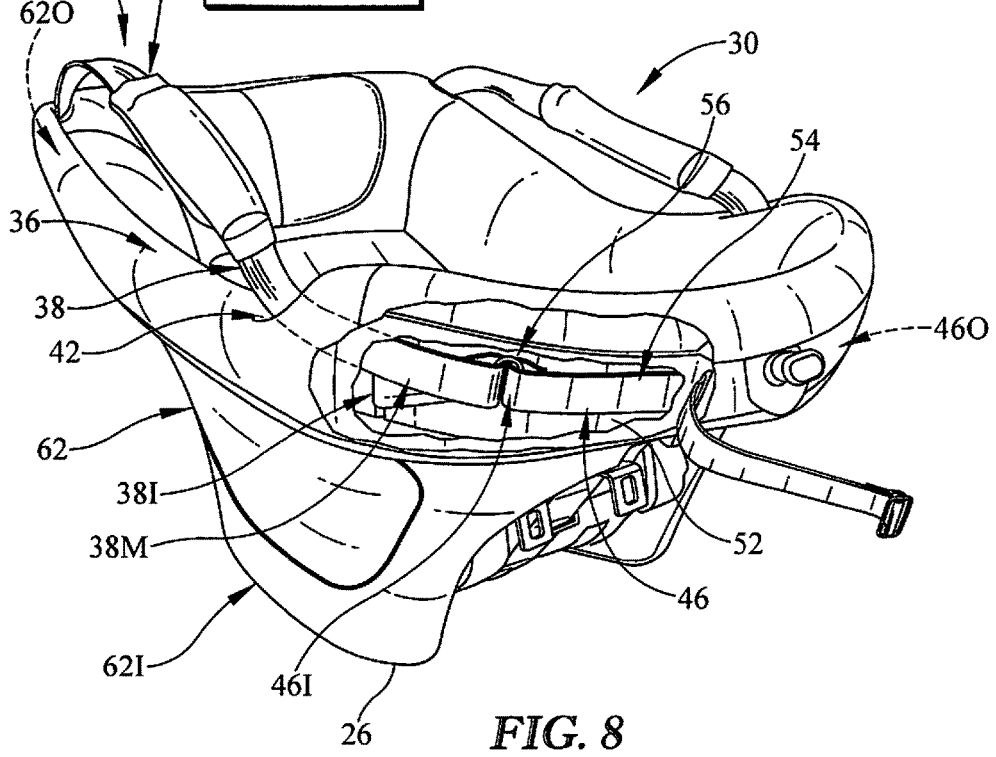
FIG. 8 is a perspective view similar to FIG. 7 in which the extensible foot-end grip tether is shown in the NORMAL CONTRACTED mode to cause the companion hand grip of the first side carry handle to be moved downwardly relative to the seating bucket to assume the LOWERED STORAGE position, with a portion of the seating bucket removed to show portions of the extensible foot-end grip tether of the first side carry handle that are normally hidden from view in the hollow chamber formed in the foot-end of the seating bucket while that tether is in the NORMAL CONTRACTED mode.

Foot-end grip tether 36 includes a movable strap segment 38 having an anchored outer end 38O coupled to the lower end of the first hand grip 32 as shown in FIGS. 7 and 8. Foot-end grip tether 36 is arranged to pass through a tether-receiving aperture 42 formed in the seating bucket 12. Foot-end grip tether 36 further includes extensible means at least partially located in a hollow region 44 formed in foot end 18 of seating bucket 12 and coupled to movable strap segment 38 and to foot end 18 of seating bucket 12 for yieldably and automatically pulling movable strap segment 38 through the tether-receiving aperture 42 formed in seating bucket 12 to move first hand grip 32 from the RAISED BUCKET-CARRYING position toward foot end 18 of seating bucket 12 to reach the LOWERED STORAGE position alongside foot end 18 of seating bucket 12 in response to release of the first hand grip 32 by a person transporting seating bucket 12 by holding the first hand grip 32 in the RAISED BUCKET-CARRYING position so that the first hand grip 32 normally remains in the LOWERED STORAGE position until a caregiver moves the first hand grip 32 upwardly relative to the seating bucket 12 toward the RAISED BUCKET-CARRYING position.

The extensible means of foot-end grip tether 36 comprises an extensible spring 46 that is coupled to the foot end 18 of seating bucket 12 at a first anchor point 48 as shown in FIGS. 6-8. Extensible spring 46 is arranged to apply a pulling force to movable strap segment 38 normally to pull movable strap segment 38 through the tether-receiving aperture 42 formed in seating bucket 12 to cause the hand grip that is coupled to movable strap segment 38 to move toward seating bucket 12 to assume the LOWERED STORAGE position.

Extensible spring 46 includes an inner end 46I that is coupled to movable strap segment 38 and an outer end 46O that is coupled to foot end 18 of seating bucket 12 at the first anchor point 48 as shown in FIG. 6. Foot end 18 of seating bucket 12 includes an interior surface 50 facing toward the interior child-carrying space 16 and an exterior surface 52 facing away from the interior child-carrying space 16. First anchor point 48 is located on the exterior surface 52 to cause a portion of extensible spring 46 to extend along the exterior surface of foot end 18 of seating bucket 12. Extensible spring 46 comprises an elastic strap 54 having an inner end 46I associated with movable strap segment 38 and an outer end 46O coupled to foot end 18 of seating bucket 12 at first anchor point 48.

Extensible spring 46 further includes a movable slide 56 mounted for back-and-forth movement on movable strap segment 38 as shown in FIGS. 7 and 8. The movable slide 56 is coupled to the elastic strap 54 to lie at a first distance from the tether-receiving aperture 42 formed in seating bucket 12 during elastic contraction of elastic strap 54 when hand grip 32 is in the LOWERED STORAGE position and alternatively at a relatively shorter second distance from the tether-receiving aperture 42 formed in the seating bucket 12 during elastic expansion of elastic strap 54 when hand grip 32 is in the RAISED BUCKET-CARRYING position. Movable slide 56 and elastic strap 54 are arranged to move on and relative to exterior surface 52 of foot end 18 of the seating bucket 12 during movement of the hand grip 32 between the RAISED BUCKET-CARRYING position and the LOWERED STORAGE position.

Movable slide 56 is formed to include a strap-segment receiver 58 as shown in FIG. 6. The movable strap segment 38 further includes an inner anchored end 38I coupled to the foot-end of the seating bucket 12 at a second anchor point 60 that is separated from the first anchor point 48. The movable strap segment 38 is arranged to extend through the strap-segment receiver 58 for movement therein during movement of hand grip between the RAISED BUCKET-CARRYING position. Inner end of elastic strap 54 is coupled to the movable slide 56 normally to apply a pulling force to the movable slide 56 to cause the movable slide 56 to move away from the tether-receiving aperture 42 formed in the seating bucket 12 and pull the movable strap segment 38 through the strap-segment receiver 58 of the movable slide 56 to move hand grip 32 relative to seating bucket 12 to assume the LOWERED STORAGE position.

The movable slide 56 is arranged to occupy a temporary position to lie between the first and second anchor points and in close proximity to each of the second anchor point 60 and the tether-receiving aperture 42 formed in the seating bucket 12 when the hand grip 32 is moved by a caregiver relative to the seating bucket 12 to assume the RAISED BUCKET-CARRYING position as shown in FIG. 7. Alternatively, the movable slide 56 is arranged to occupy a normal position after the caregiver has released the hand grip 32 to allow the elastic strap 54 to pull the movable slide 56 away from the second anchor point 60 in a direction toward the first anchor point 48 to cause sufficient movement of the movable strap segment 38 in the tether-receiving aperture 42 formed in the seating bucket 12 to draw the hand grip 32 from the RAISED BUCKET-CARRYING position to the LOWERED STORAGE position as shown in FIG. 8.

The movable slide 56 and the elastic strap 54 are arranged to move on and relative to the exterior surface 52 of foot end 18 of seating bucket 12 during movement of hand grip 32 between the RAISED BUCKET-CARRYING position and the LOWERED STORAGE position as shown in FIGS. 7 and 8. First anchor point 48 is associated with the outer end 48O of the elastic strap 54 and is located in close proximity to second side wall 24 of seating bucket 12. Second anchor point 60 is associated with outer end 38O of the movable strap segment 38 and is located between first anchor point 48 and the tether-receiving aperture 42 formed in seating bucket 12.

The movable strap segment 38 further includes an anchored inner end 38I that is coupled to foot end 18 of seating bucket 12 and arranged to lie opposite to the outer anchored end 38O as shown in FIGS. 6-8. A middle portion 38M is also included in the movable strap segment 38 and is arranged to interconnect the inner and outer anchored ends 38I, 38O and to pass through the tether-receiving aperture 42 formed in the seating bucket 12. The extensible means is coupled at one end thereof to middle portion 38M of the movable strap segment 38 and at another end thereof to foot end 18 of seating bucket 12.

Seating bucket 12 further includes a floor 26 located between first and second side walls 22, 24 as shown in FIGS. 7 and 8. Floor 26 is arranged to extend from foot end 18 to the opposite head end 20. Foot end 18 of seating bucket 12 includes a concave panel 62 arranged to extend from first side wall 22 to second side wall 24. Concave panel 62 is configured to include an inner proximal end 62I coupled to floor 26 and an outer free end 62O arranged to lie in spaced-apart relation to floor 26 to locate the inner proximal end 62I therebetween. The hollow region 44 formed in foot end 18 of seating bucket 12 is located at the outer free end 62O of the concave panel 62 included in foot end 18 of seating bucket 12.

Elastic strap 54 is made of an elastic material configured to move the movable slide 56 away from the tether-receiving aperture 42 formed in seating bucket 12 toward first anchor point 48 while applying a pulling force to middle portion 38M of movable strap segment 38 as shown in FIG. 8. The pulling force is sufficient to move middle portion 38M of movable strap segment 38 in a first direction in the tether-receiving aperture 42 formed in seating bucket 12 to move hand grip 32 relative to seating bucket 12 normally to assume the LOWERED STORAGE position until a caregiver moves the hand grip 32 upwardly way from seating bucket 12 by apply a tugging force as shown in FIG. 7. The tugging force may be applied to middle portion 38M of movable strap segment 38 that is opposite to and greater than the pulling force applied to middle portion 38M of movable strap segment 38 by elastic strap 54 of extensible means. The tugging force may cause middle portion 38M of movable strap segment 38 to be moved in an opposite second direction in the tether-receiving aperture 42 formed in seating bucket 12.

Hand grip 32 is arranged to be gripped and moved relative to seating bucket 12 by a person carrying seating bucket 12 from a LOWERED STORAGE position located in close proximity to foot end 18 of seating bucket 12 to a RAISED BUCKET-CARRYING position located above a mid-section of first side wall 22 and between the foot and head ends 18, 20 of seating bucket 12 as shown in FIGS. 1 and 2. Extensible foot-end grip tether 36 is arranged to extend through tether-receiving aperture 42 formed in the seating bucket 12 for sliding movement therein during a mode change of the extensible foot-end grip tether 36 between a NORMAL CONTRACTED mode and a TEMPORARY EXTENDED mode. In the NORMAL CONTRACTED mode, the extensible foot-end grip tether 36 is shortened to a first effective length to retain hand grip 32 in the LOWERED STORAGE position in close proximity to foot end 18 of seating bucket 12 in the absence of an application of an upward tugging force to hand grip by a caregiver that is sufficient by a caregiver that is to pull hand grip 32 relative to seating bucket 12 in a direction away from the LOWERED STORAGE position. In the TEMPORARY EXTENDED mode, the effective length of the extensible foot-end grip tether 36 is lengthened to a relatively longer second length in response to application of an upward tugging force to hand grip 32 by the caregiver that is sufficient to move a portion of the extensible foot-end grip tether 36 through the tether-receiving aperture 42 formed in the seating bucket 12 to cause the first hand grip 32 to move from the LOWERED STORAGE position relative to the seating bucket 12 in a direction away from seating bucket 12 to assume the RAISED BUCKET-CARRYING position.

Figure 9:
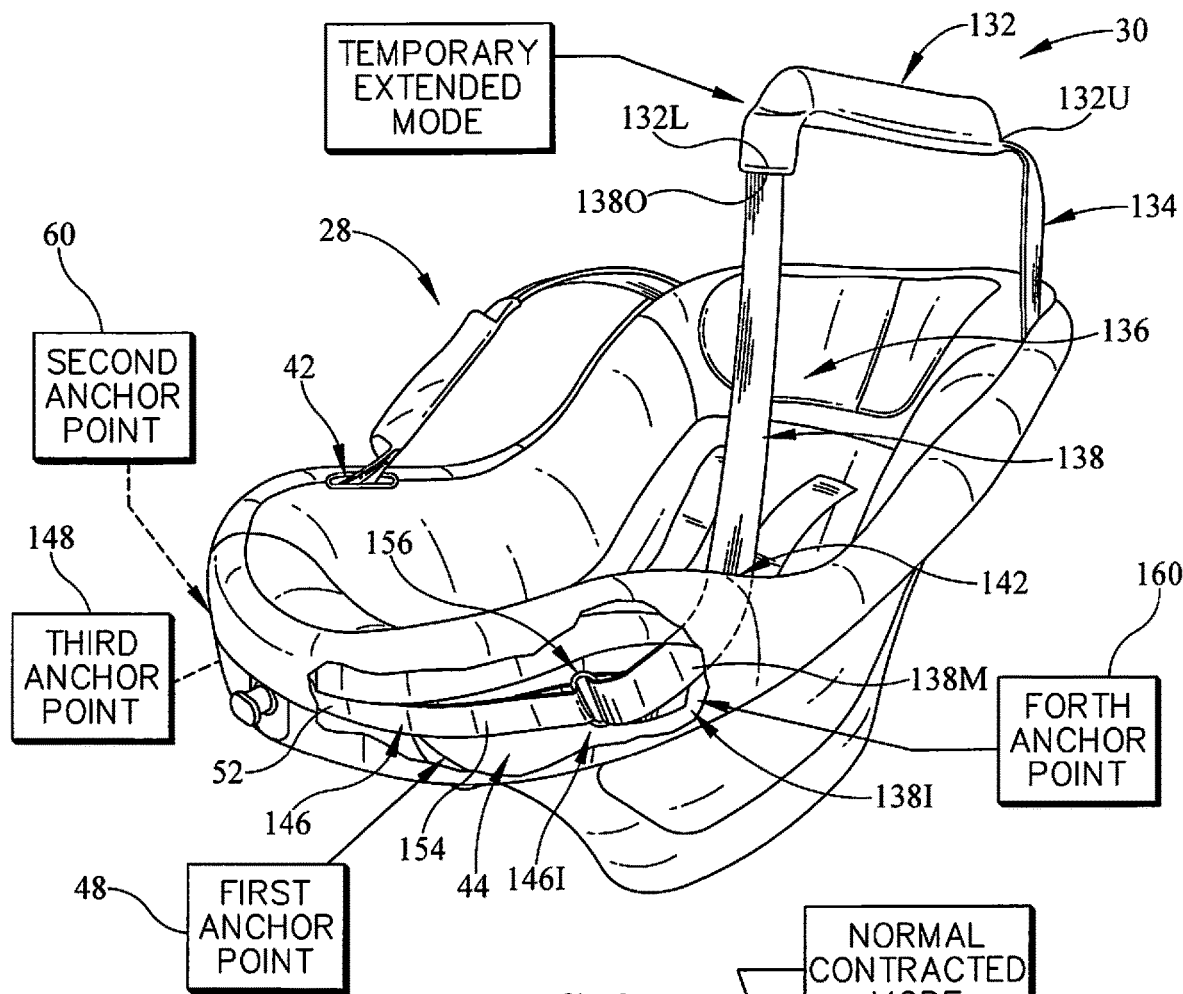
FIG. 9 is a perspective view of the infant excursion seat of FIG. 2 in which the hand grip of the second side carry handle is shown in the RAISED BUCKET-CARRYING position and the companion extensible foot-end grip tether is shown in the TEMPORARY EXTENDED mode, with a portion of the seating bucket removed to show portions of the extension foot-end grip tether of the second side carry handle that are normally hidden from view in a hollow chamber formed in the foot-end of the seating bucket while that tether is in the TEMPORARY EXTENDED mode.
Figure 10:
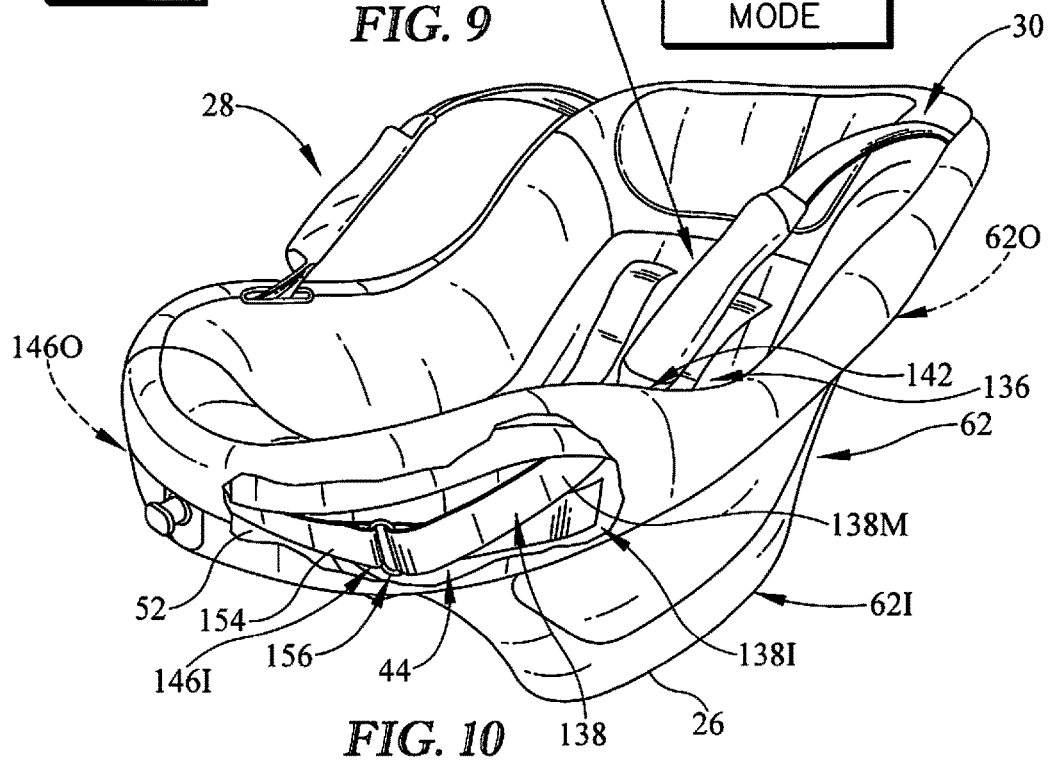
FIG. 10 is a perspective view similar to FIG. 7 in which the hand grip of the second side carry handle is shown in the LOWERED STORAGE position and the companion extensible foot-end grip tether is shown in the NORMAL CON-TRACTED mode, with a portion of the seating bucket removed to show portions of the extensible foot-end grip tether of the second side carry handle that are normally hidden from view in the hollow chamber formed in the foot-end of the seating bucket while that tether is in the NORMAL CONTRACTED mode.

Second side carry handle 30 is substantially similar to first side-carry handle 28 and operates in substantially the same way as first side-carry handle 28 as suggested in FIGS. 9 and 10. Second side-carry handle 30 includes a second hand grip 132, a head-end grip tether 134, and a foot-end grip tether 136. Similar references numbers in the 100 series are used to reference common features between first-side carry handle 28 and second-side carry handle 30 and the disclosure above for first-side carry handle 28 is incorporated by reference herein for second-side carry handle 30 except for the differences discussed below.

Figure 11:
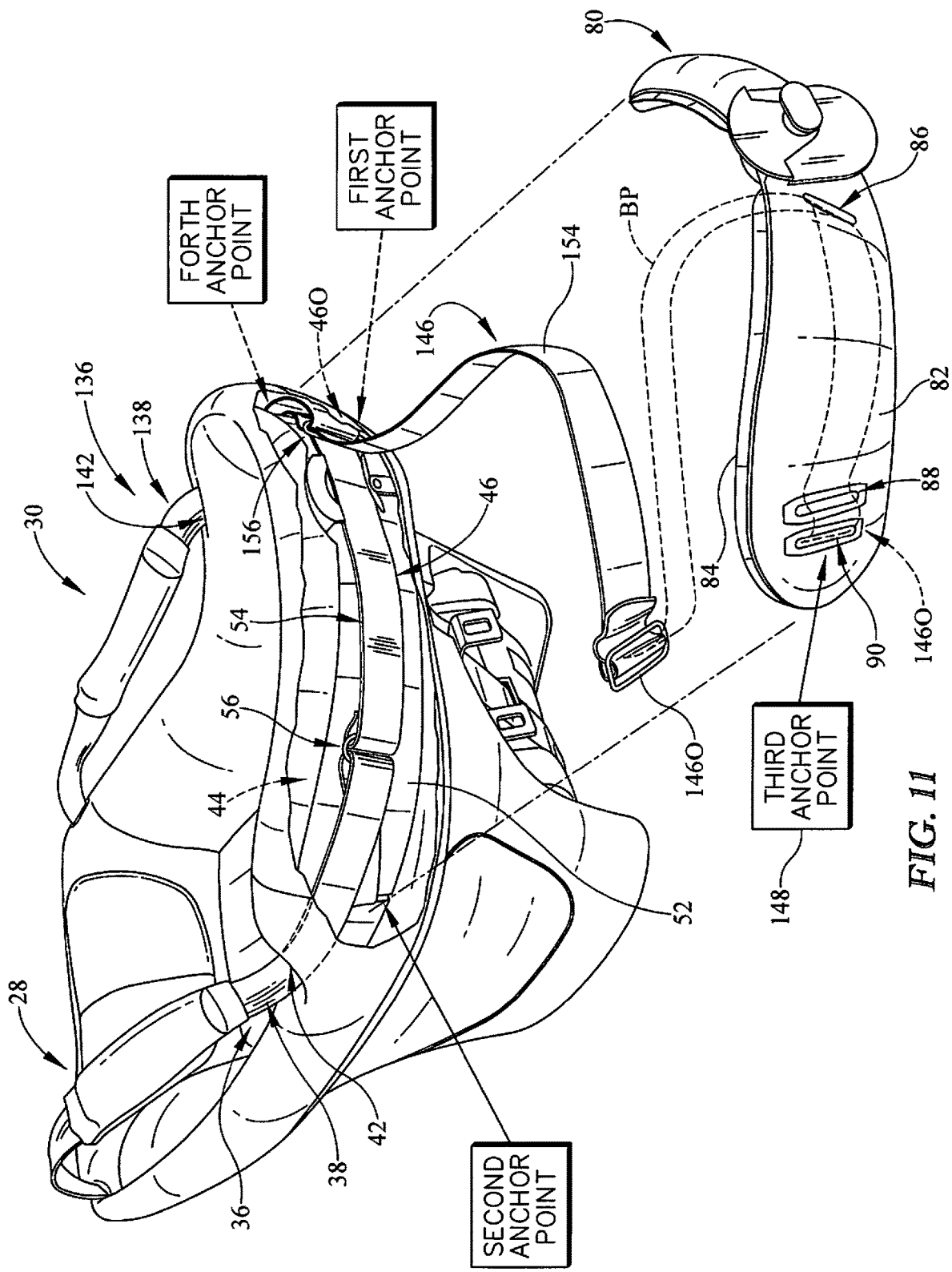
FIG. 11 is a partly exploded assembly view of the foot end of the seating bucket showing that the foot end of the seating bucket further includes a cover panel that cooperates with an exterior surface to define a hollow region between an inner surface of the cover panel and the exterior surface and showing an extensible spring of the second side carry handle uncoupled from the foot end with dashed lines indicating a belt path of the extensible spring with an anchor point on the cover panel.

The foot end 18 of seating bucket 12 further includes a cover panel 80 having an outer surface 82 facing away from the interior child-carrying space 16 and an inner surface 84 facing toward the interior child-carrying space 16 as shown in FIG. 11. Cover panel 80 is removable from exterior surface 52 of foot end 18 as suggested in FIG. 11 but is normally mounted to exterior surface 52 to conceal movable slide 56 and elastic strap 54 from view. Hollow interior region 44 is defined between exterior surface 52 of foot end 18 and inner surface 84 of cover panel 80. Movable strap segment 38 and extensible spring 46 of first side-carry handle 28 are arranged within hollow interior region 44. When a caregiver applies the pulling force on the hand grip 32, only the movable strap segment 38 is pulled out of tether-receiving aperture 42 and in view by the caregiver. The extensible means including elastic strap 54 is not pulled through the tether-receiving aperture 42 with the movable strap segment 38. This provides the caregiver with an a safety perception that is similar to non-extensible side carry handles without elastic straps.

Foot-end grip tether 136 of second side-carry handle 30 includes a second movable strap segment 138 and a second extensible spring 146 as shown in FIGS. 9-11. An outer end 146O of extensible spring 146 is mounted to cover panel 80 at a third anchor point 148. An inner end 138I of movable strap segment 138 is mounted to exterior surface 52 of foot end 18 at a fourth anchor point 160. Third anchor point 148 is located between first anchor point 48 and second anchor point 60. Fourth anchor point 160 is located between first anchor point 48 and tether-receiving aperture 142.

Extensible spring 146 includes an elastic strap 154 and a movable slide 156 as shown in FIGS. 9-11. Movable slide 156 is mounted to movable strap segment 138 at a middle portion 138M for sliding movement as hand grim 132 is pulled by a caregiver from a LOWERED STORAGE position, as shown in FIG. 10, to a RAISED BUCKET-CARRYING position, as shown in FIG. 9. Elastic strap 154 extends away from movable slide 156 and movable strap segment 138 toward second anchor point 60 and third anchor point 148 along a belt path BP through slots formed in cover panel 80 as shown in FIG. 11. Elastic strap 154 extends out of interior hollow region 44 through a first slot 86 and extends along exterior surface 82 of cover panel 80. Elastic strap 154 then extends through a second slot 88 into interior hollow region 44 and back through third slot 90 to provide third anchor point 148 in cover panel 80.

Figure 13:
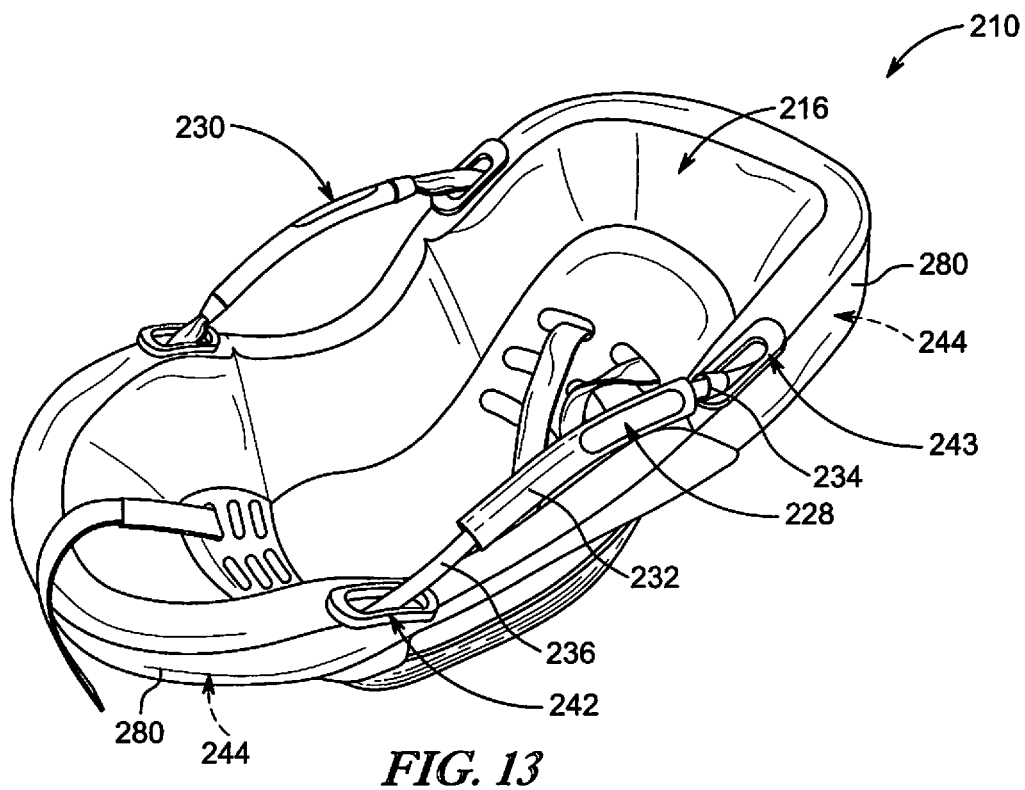
FIG. 13 is a perspective view of the infant excursion seat shown in FIG. 12 in which the first and second side-carry handles are arranged to lie in the LOWERED STORAGE position to establish a NORMAL CONTRACTED mode of the infant excursion seat.

A child restraint 211 in accordance with a second embodiment of the present disclosure comprises an infant excursion seat 210 including a seating bucket 212 and a bucket carrier 214 as shown in FIGS. 12 and 13. Seating bucket 212 is formed to include an interior child-carrying space 216. Seating bucket 212 including a foot end 218, an opposite head end 220, a first side wall 222 extending between the foot and head ends, and a second side wall 224 extending between the foot and head ends and lying in spaced-apart relation to the first side wall 222 to locate the interior child-carrying space 216 therebetween. Bucket carrier 214 includes a first side carry handle 228 associated with first side wall 222 of seating bucket 212 and a second side carry handle 230 associated with second side wall 224 of seating bucket 212.

First side carry handle 228 includes a first hand grip 232, a head-end grip tether 234, and a foot-end grip tether 236 as shown in FIGS. 12 and 13. First hand grip 232 is arranged to be gripped and moved relative to seating bucket 212 by a person carrying seating bucket 212 from a LOWERED STORAGE position located in close proximity to foot end 18 of seating bucket 212, as shown in FIG. 13, to a RAISED BUCKET-CARRYING position that is located above a mid-section of first side wall 222 and between the foot and head ends of seating bucket 212 as shown in FIG. 12. First hand grip 232 includes an upper end facing toward the head end 220 of seating bucket 212 and a lower end facing toward foot end 218 of seating bucket 212. Head-end grip tether 234 is arranged to interconnect the upper end of the first hand grip 232 and the head end 220 of seating bucket 212. Foot-end grip tether 236 is includes a movable strap segment 38 having an anchored outer end 238O coupled to the lower end of the first hand grip 232.

Figure 14:
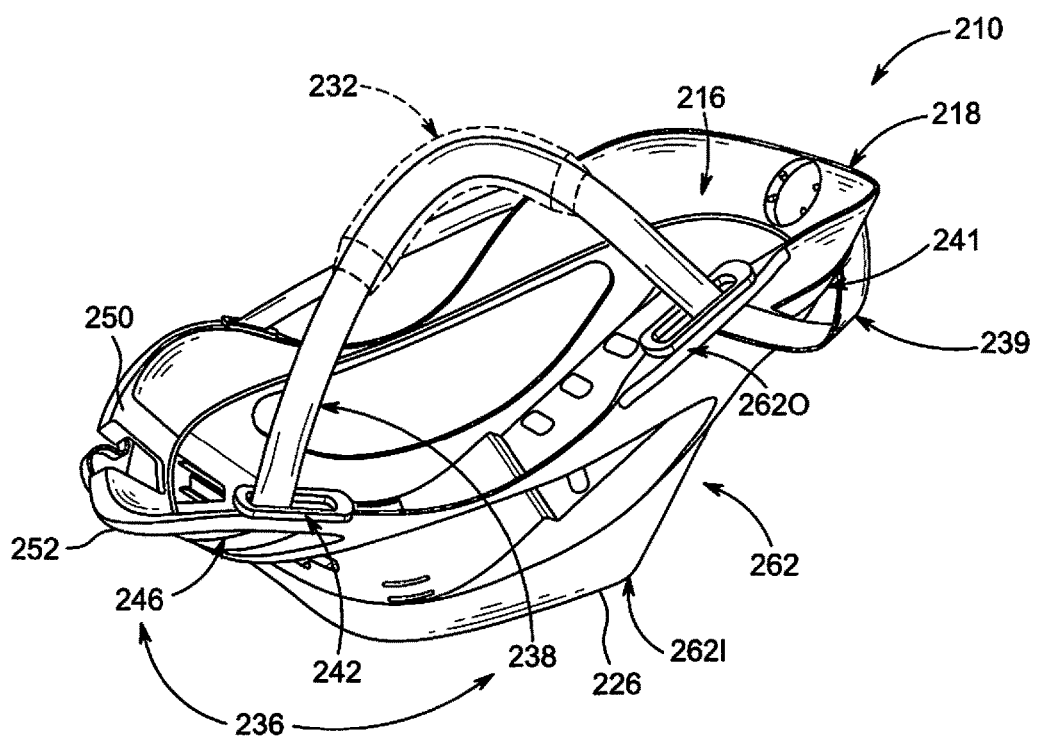
FIG. 14 is another perspective view of the infant excursion seat with portions of the infant excursion seat removed to show the first side-carry handle arranged to lie in the RAISED BUCKET-CARRYING position.

Foot-end grip tether 236 is arranged to pass through the tether-receiving aperture 242 formed in the seating bucket 212 as shown in FIGS. 12-14. Foot-end handle tether further includes extensible means located in a hollow region formed in foot end 218 of seating bucket 212 and coupled to movable strap segment 238 and to foot end 218 of seating bucket 212 for yieldably and automatically pulling movable strap segment 238 through the tether-receiving aperture 242 formed in seating bucket 212 to move first hand grip 232 from the RAISED BUCKET-CARRYING position toward foot end 218 of seating bucket 212 to reach the LOWERED STORAGE position alongside foot end 218 of seating bucket 212 in response to release of the first hand grip 232 by a person transporting seating bucket 212 by holding the first hand grip 232 in the RAISED BUCKET-CARRYING position so that the first hand grip 232 normally remains in the LOWERED STORAGE position until a caregiver moves the first hand grip 232 upwardly relative to the seating bucket 212 toward the RAISED BUCKET-CARRYING position.

Figure 16:
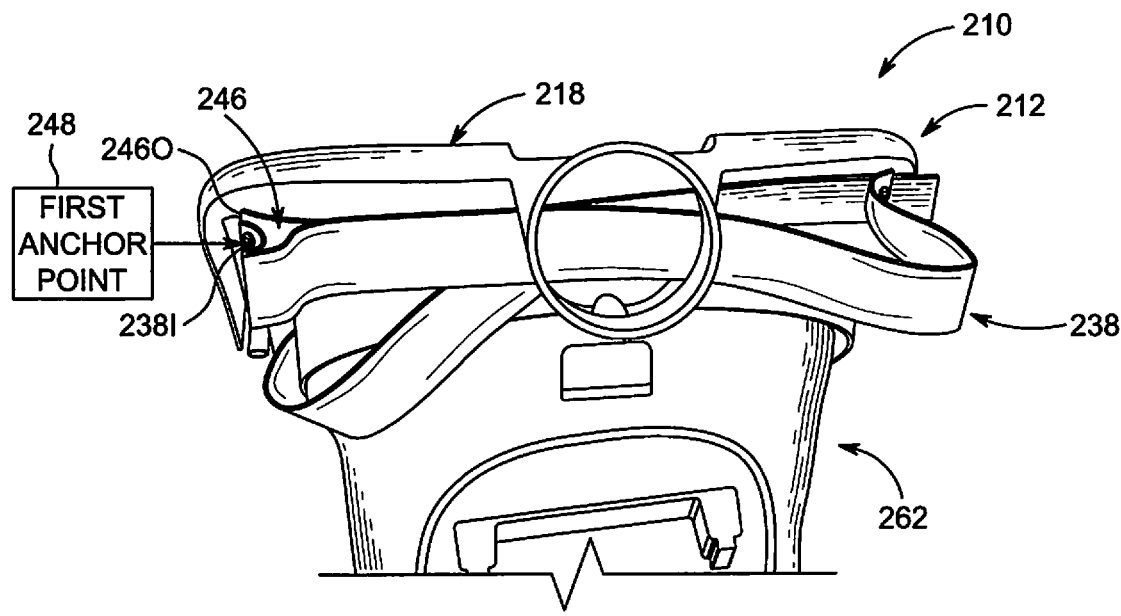
FIG. 16 is a perspective view of the infant excursion seat taken from a foot end of the infant excursion seat with portions of the infant excursion seat removed to show that the first and second side-carry handles each include a first movable strap segment and a first extensible spring coupled to the foot end of the seating bucket.

The extensible means of foot-end grip tether 236 comprises an extensible spring 246 that is coupled to the foot end 18 of seating bucket 212 at a first anchor point 248 as shown in FIG. 16. Extensible spring 246 is arranged to apply a pulling force to movable strap segment 238 normally to pull movable strap segment 238 through the tether-receiving aperture 242 formed in seating bucket 212 to cause the hand grip that is coupled to movable strap segment 238 to move toward seating bucket 212 to assume the LOWERED STORAGE position.

Figure 15:
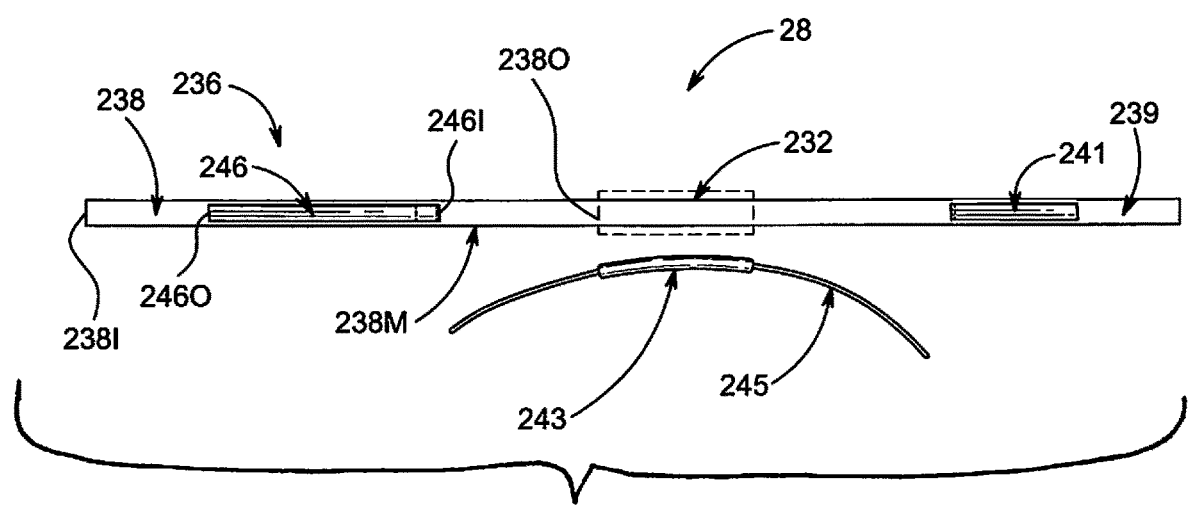
FIG. 15 is an exploded assembly view of the first side-carry handle.

Extensible spring 246 includes an inner end 246I that is coupled to movable strap segment 238 and an outer end 246O that is coupled to foot end 218 of seating bucket 212 at the first anchor point 248 as shown in FIG. 15. Foot end 218 of seating bucket 212 includes an interior surface 250 facing toward the interior child-carrying space 216 and an exterior surface 252 facing away from the interior child-carrying space 216. First anchor point 248 is located on the exterior surface to cause a portion of extensible spring 246 to extend along the exterior surface 252 of foot end 218 of seating bucket 212 Extensible spring 246 comprises an elastic strap 254 having an inner end associated with movable strap segment 238 and an outer end coupled to foot end 218 of seating bucket 212 at first anchor point 248.

Movable strap segment 238 further includes an anchored inner end 238I that is coupled to foot end 218 of seating bucket 212 and is arranged to lie opposite to the outer anchored end as shown in FIGS. 15 and 16. A middle portion 238M is also included in the movable strap segment 238 and is arranged to interconnect the inner and outer anchored ends 238I, 238O and to pass through the tether receiving aperture 242 formed in the seating bucket 212. The extensible means is coupled at one end thereof to middle portion 238M of the movable strap segment 238 and at another end thereof to foot end 218 of seating bucket 212.

Seating bucket 212 further includes a floor 226 located between first and second side walls 222, 224 as shown in FIG. 1. Floor 226 is arranged to extend from the foot end 218 to the opposite head end 220. Foot end 218 of seating bucket 212 includes a concave panel 262 arranged to extend from first side wall 222 to second side wall 224. Concave panel 262 is configured to include an inner proximal end 262I coupled to floor 226 and an outer free end 262O arranged to lie in spaced-apart relation to floor 226 to locate the inner proximal end 262I therebetween, The hollow region 244 formed in foot end 218 of seating bucket 212 is located at the outer free end 262O of the concave panel 262 included in foot end 218 of seating bucket 212.

Hand grip 232 is arranged to be gripped and moved relative to seating bucket 212 by a person carrying seating bucket 212 from a LOWERED STORAGE position located in close proximity to foot end 218 of seating bucket 212 to a RAISED BUCKET-CARRYING position located above a mid-section of first side wall 222 and between the foot and head ends of seating bucket 212. Hand grip includes an upper end facing toward head end 220 of seating bucket 212 and a lower end facing toward foot end 218 of seating bucket 212.

Extensible means of foot-end grip tether 236 is coupled at the opposite end thereof to foot end 218 of seating bucket 212 at a first anchor point 248 as shown in FIG. 16. Elastic strap 254 is made of an elastic material configured to move the movable slide 256 away from the tether-receiving aperture 242 formed in seating bucket 212 toward first anchor point 248 while applying a pulling force to the middle portion of movable strap segment 238 sufficient to move middle portion of movable strap segment 238 in a first direction in the tether-receiving aperture 242 formed in seating bucket 212 to move hand grip 232 relative to seating bucket 212 normally to assume the LOWERED STORAGE position until a caregiver moves hand grip 232 upwardly way from seating bucket 212 to apply a tugging force to middle portion of the movable strap segment 238 that is opposite to and greater than the pulling force applied to middle portion of the movable strap segment 238 by the elastic strap 254 of extensible means so as to cause middle portion of movable strap segment 238 to be moved in an opposite second direction in the tether-receiving aperture 242 formed in the seating bucket 212.

The movable strap segment 238 further includes an inner anchored end 238I coupled to foot end 218 of seating bucket 212 at a first anchor point 248 and a middle portion 238M located between the inner and outer anchored ends 238I, 238O as shown in FIGS. 15 and 16. The extensible spring 246 is coupled at one end to middle portion of movable strap segment 238 and at an opposite end to foot end 218 of seating bucket 212 at first anchor point 248. The extensible spring 246 is stretched to lie along and in side-by-side relation to a section of the movable strap segment 238 when the hand grip 232 occupies the RAISED BUCKET-CARRYING position and is unstretched to disengage portions of the section and form a free loop when hand grip 232 occupies the LOWERED STORAGE position.

Extensible foot-end grip tether 236 arranged to interconnect lower end of hand grip 232 and foot end 218 of seating bucket 212 as shown in FIGS. 12 and 13. Extensible foot-end grip tether 236 is arranged extend through a tether-receiving aperture 242 formed in the seating bucket 212 for sliding movement therein during a mode change of the extensible foot-end grip tether 236 between a NORMAL CONTRACTED mode in which the extensible foot-end grip tether 236 is shortened to a first effective length to retain hand grip 232 in the LOWERED STORAGE position in close proximity to foot end 218 of seating bucket 212 in the absence of an application of an upward tugging force to hand grip 232 by a caregiver sufficient to pull hand grip 232 relative to seating bucket 212 in a direction away from the LOWERED STORAGE position and a TEMPORARY EXTENDED mode in which the effective length of the extensible foot-end grip tether 236 is lengthened to a relatively longer second length in response to application of an upward tugging force to hand grip 232 by the caregiver that is sufficient to move a portion of the extensible foot-end grip tether 236 through the tether-receiving aperture 242 formed in the seating bucket 212 to cause hand grip 232 to move from the LOWERED STORAGE position relative to seating bucket 212 in a direction away from seating bucket 212 to assume the RAISED BUCKET-CARRYING position.

Child restraint 211 in accordance with the present disclosure includes an infant excursion seat 210 and a base (i.e. base 13) as shown in FIG. 12. Infant excursion seat 210 comprises a seat bucket 212, a first side carry handle 228, and a second side carry handle 230 arranged opposite first side carry handle 228 as shown in FIGS. 12 and 13. Seat bucket 212 is formed to include a child-receiving space 216. First side carry handle 228 is coupled to a first lateral side 222 of seat bucket 212 while second side carry handle 230 is coupled to a second lateral side 224 of seat bucket 212. Both first and second side carry handles 228, 230 are retractable and can be changed from a LOWERED STORAGE position, as shown in FIG. 13, to an RAISED BUCKET-CARRYING position to transport a child in the seat bucket 212, as shown in FIG. 12.

In the LOWERED STORAGE position, a hand grip 232 of first and second side carry handles 228, 230 is brought closer to seat bucket 212 to store first and second side carry handles 228, 230 out of interference with the child or the user as shown in FIG. 13. A user may grasp hand grips 232 of first and second side carry handles 228, 230 and pull hand grips 232 away from seat bucket 212 to carry and transport infant excursion seat 210 as suggested in FIG. 12.

Both first and second side carry handles 228, 230 include a movable strap segment 238, 239 and an extensible spring 246, 247 coupled to a companion movable strap segment 238, 239 as shown in FIG. 15. Movable strap segments 238, 239 are flexible and may be manipulated by the user to change first and second side carry handles 228, 230 from the LOWERED STORAGE position to the RAISED BUCKET-CARRYING position. Extensible springs 246, 247 are configured to bias movable strap segments 238, 239 toward the LOWERED STORAGE position when infant excursion seat 210 is not being carried by the user. In the illustrative embodiment, extensible springs 246, 247 are stretchable straps, however, another suitable extensible spring such as, for example, a spring or rubber band may be used.

Both first and second side carry handles 228, 230 further include a cable 245 and a foam grip 243 each located within movable strap segments 238, 239 as shown in FIG. 15. Cables 245 are fixed to movable strap segments 238, 239 along hand grips 232. Cables 245 strengthen first and second side carry handles 228, 230 while providing flexibility for side carry handles 228, 230 to change from the LOWERED STORAGE position to the RAISED BUCKET-CARRYING position. Foam grips 243 are located in hand grips 232 and provide increased comfort for the user when carrying infant excursion seat 210. First and second side carry handles 28, 30 may also include cables and foam pads similar to cables 245 and foam pads 243.

Figure 17:
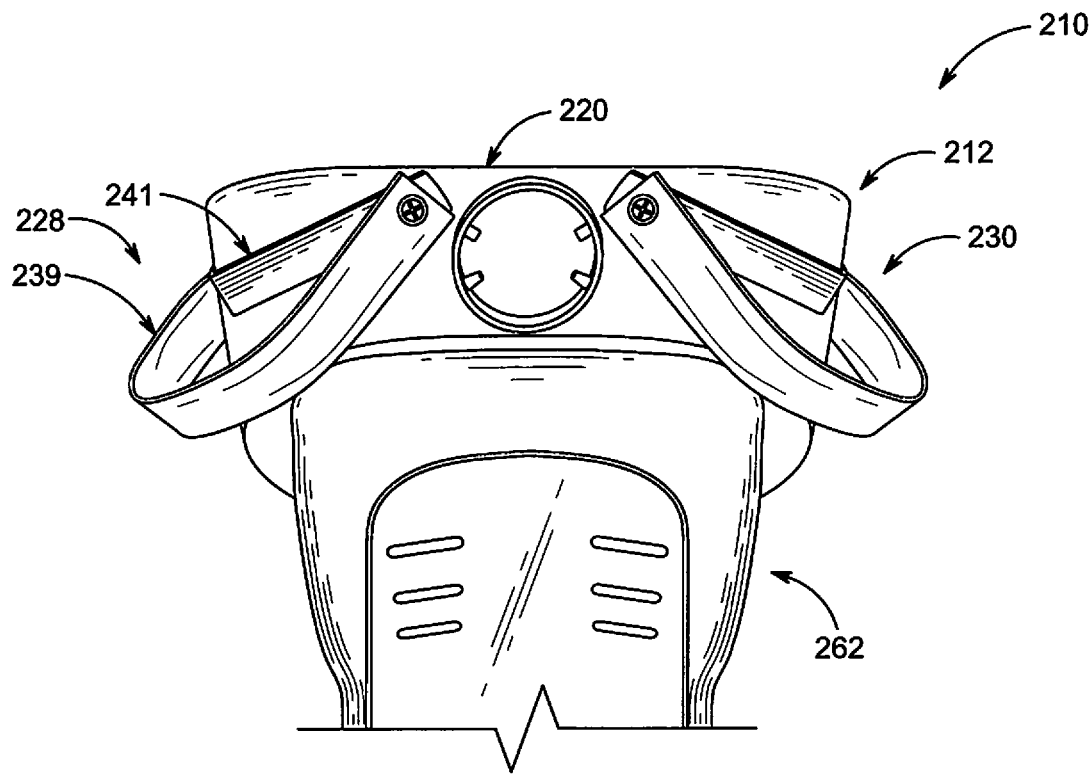
FIG. 17 is a perspective view of the infant excursion taken from a head end of the infant excursion seat with portions of the infant excursion seat removed to show that the first and second side-carry handles each include a second movable strap segment and a second extensible spring coupled to the head end of the seating bucket.

First and second side-carry handles 228, 230 are substantially similar to one another. Both first and second side carry handles 228, 230 have attachment points at a head end 220 and a foot end 218 of seat bucket 212 as shown in FIGS. 16 and 17. In the illustrative embodiment, the outer end 246O of extensible spring 246 and the inner end 238I of movable strap segment 238 extend along an outer surface of seat bucket 12 and are attached to seat bucket 212 at the same location at anchor point 248. Extensible spring 246 is fixed to movable strap segment 238 and has a shorter length than movable strap segment 238 to provide slack in a portion of movable strap segment 238 due to extensible spring 246 biasing movable strap segment 238 toward the LOWERED STORAGE position. When a user pulls hand grip 232, extensible spring 246 is stretched and the slack is removed from movable strap segment 238 to establish the RAISED BUCKET-CARRYING position. With the slack removed, movable strap segment 238 supports most of the weight of seat bucket 212 at anchor point 248.

The infant excursion seat 210 further comprises cover panels 280 as shown in FIG. 13. Cover panels 280 are mounted on an outside surface of seat bucket 212. Hollow regions 244 are defined between seat bucket 212 and cover panels 280. Hollow regions 244 receive portions of movable strap segments 238 and extensible spring 246 and obstruct view of the slack in movable strap segments 238 and help guide movable strap segments 238 as side carry handles 228, 230 change from the LOWERED STORAGE position to the RAISED BUCKET-CARRYING position. When a caregiver applies the pulling force on the hand grip 232, only the movable strap segment 238 is pulled out of tether-receiving aperture 242 and in view by the caregiver. This provides the caregiver with an a safety perception that is similar to non-extensible side carry handles without elastic straps.

A child restraint 311 in accordance with a third embodiment of the present disclosure comprises an infant excursion seat 310 including a seating bucket 312 and a bucket carrier 314 as suggested in FIGS. 18-23. Seating bucket 312 is formed to include an interior child-carrying space 316. Seating bucket 312 including a foot end 318, an opposite head end 320, a first side wall 322 extending between the foot and head ends 318, 320, and a second side wall 324 extending between the foot and head ends 318, 320 and lying in spaced-apart relation to the first side wall 322 to locate the interior child-carrying space 316 therebetween. Bucket carrier 314 includes a first side carry handle 328 associated with first side wall 322 of seating bucket 312 and a second side carry handle 330 associated with second side wall 324 of seating bucket 312.

First side carry handle 328 includes a first hand grip 332, a head-end grip tether 334, and a foot-end grip tether 336. First hand grip 332 is arranged to be gripped and moved relative to seating bucket 312 by a person carrying seating bucket 312 from a LOWERED STORAGE position located in close proximity to foot end 318 of seating bucket 312 to a RAISED BUCKET-CARRYING position that is located above a mid-section of first side wall 322 and between the foot and head ends 318, 320 of seating bucket 312. First hand grip 332 includes an upper end facing toward the head end 320 of seating bucket 312 and a lower end facing toward foot end 318 of seating bucket 312. Head-end grip tether 334 is arranged to interconnect the upper end of the first hand grip 332 and the head end 320 of seating bucket 312. Foot-end grip tether 336 includes a movable strap segment 338 having an anchored outer end 338O coupled to the lower end of the first hand grip 332.

Figure 18:
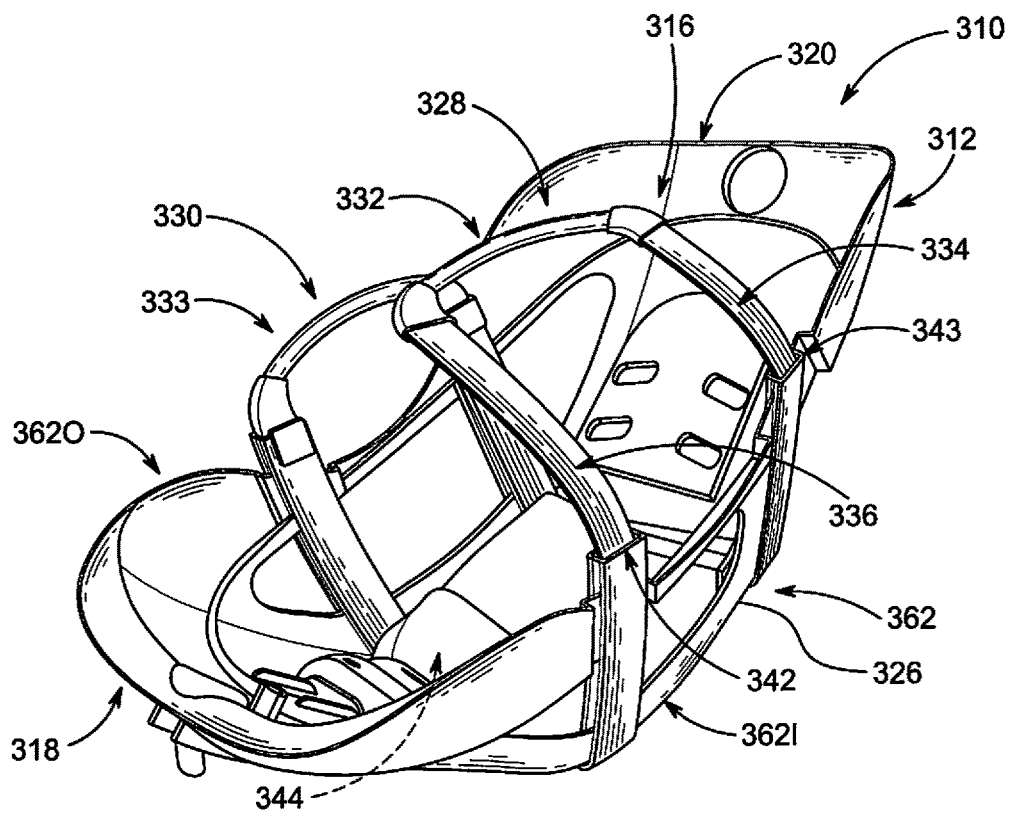
FIG. 18 is a perspective view of an infant excursion seat in accordance with a third embodiment of the present disclosure and showing that infant excursion seat the infant excursion seat includes first and second side carry handles that are retractable from a RAISED BUCKET-CARRYING position in a TEMPORARY EXTENDED mode to a LOWERED STORAGE position as shown in FIG. 19.

Foot-end grip tether 336 is arranged to pass through a tether-receiving aperture 342 formed in the seating bucket 312 as shown in FIG. 18. Foot-end handle tether 336 further includes extensible means located in a hollow region 344 formed in foot end 318 of seating bucket 312 and coupled to movable strap segment 338 and to foot end 318 of seating bucket 312 for yieldably and automatically pulling movable strap segment 338 through the tether-receiving aperture 342 formed in seating bucket 312 to move first hand grip 332 from the RAISED BUCKET-CARRYING position toward foot end 318 of seating bucket 312 to reach the LOWERED STORAGE position alongside foot end 318 of seating bucket 312 in response to release of the first hand grip 332 by a person transporting seating bucket 312 by holding the first hand grip 332 in the RAISED BUCKET-CARRYING position so that the first hand grip 332 normally remains in the LOWERED STORAGE position until a caregiver moves the first hand grip 332 upwardly relative to the seating bucket 312 toward the RAISED BUCKET-CARRYING position.

Figure 21:
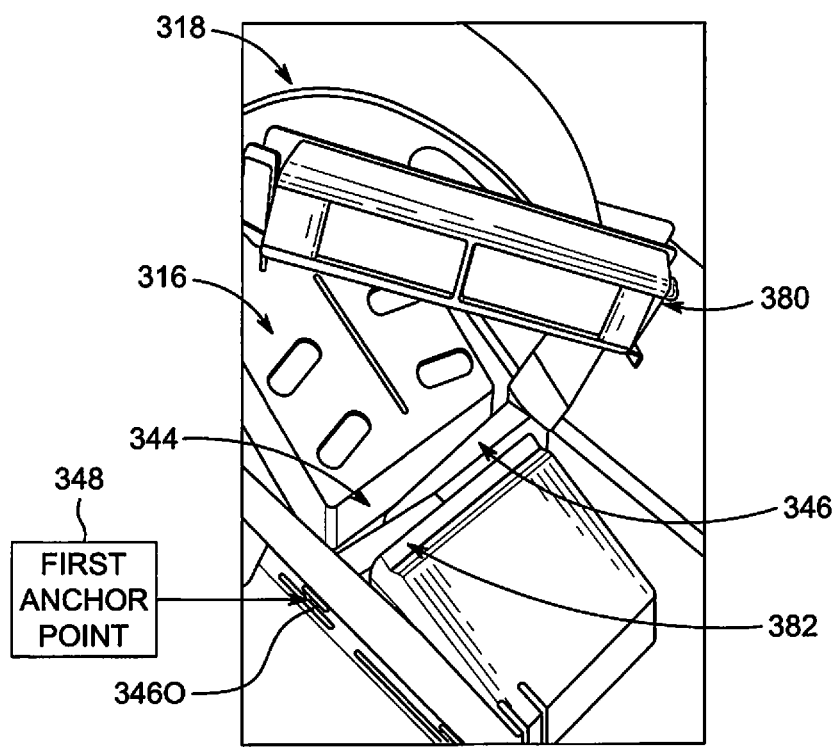
FIG. 21 is a perspective view of a portion of the infant excursion seat looking into a child-carrying region with a cover panel removed to show that the side carry handles include an extensible spring arranged in a hollow region.

The extensible means of foot-end grip tether 336 comprises an extensible spring 346 that is coupled to the foot end 318 of seating bucket 312 at a first anchor point 348 as shown in FIG. 21. Extensible spring 46 is arranged to apply a pulling force to movable strap segment 38 normally to pull movable strap segment 38 through the tether-receiving aperture 342 formed in seating bucket 312 to cause the hand grip 332 that is coupled to movable strap segment 338 to move toward seating bucket 312 to assume the LOWERED STORAGE position.

Extensible spring 346 includes an inner end 346I that is coupled to movable strap segment 338 and an outer end 346O that is coupled to foot end 318 of seating bucket 312 at the first anchor point 348 as shown in FIGS. 20 and 21. Foot end 318 of seating bucket 312 includes an interior surface 350 facing toward the interior child-carrying space 316 and an exterior surface 352 facing away from the interior child-carrying space 316. First anchor point 348 is located on the exterior surface 352 to cause a portion of extensible spring 346 to extend along the exterior surface of foot end 318 of seating bucket 312. Extensible spring 346 comprises an elastic strap 354 having an inner end associated with movable strap segment 338 and an outer end coupled to foot end 318 of seating bucket 312 at first anchor point.

The movable strap segment 38 further includes an inner end 338I and an opposite outer end 338O anchored to hand grip 332 as shown in FIG. 20. Extensible spring 346 is coupled at one end to inner end 338I of movable strap segment 338 and at another end to the foot end 318 of seating bucket 312.

Seating bucket 312 further includes a floor 326 located between first and second side walls as shown in FIG. 18. Floor 326 is arranged to extend from the foot end 318 to the opposite head end 320. Foot end 318 of seating bucket 312 includes a concave panel 362 arranged to extend from first side wall 322 to second side wall. Concave panel 362 is configured to include an inner proximal end 362I coupled to the floor 326 and an outer free end 362O arranged to lie in spaced-apart relation to floor 326 to locate the inner proximal end 362I therebetween. A portion of extensible spring 346 is arranged to extend along the inner proximal end 362I of the concave panel 362 included in the seating bucket 312 in close proximity to the floor 326 and in spaced-apart relation to the outer free end 362O of the concave panel 362.

Hand grip 332 is arranged to be gripped and moved relative to seating bucket 312 by a person carrying seating bucket 312 from a LOWERED STORAGE position located in close proximity to foot end 318 of seating bucket 312 to a RAISED BUCKET-CARRYING position located above a mid-section of first side wall 322 and between the foot and head ends of seating bucket 312. Hand grip includes an upper end facing toward head end 320 of seating bucket 312 and a lower end facing toward foot end 318 of seating bucket 312.

Figure 22:
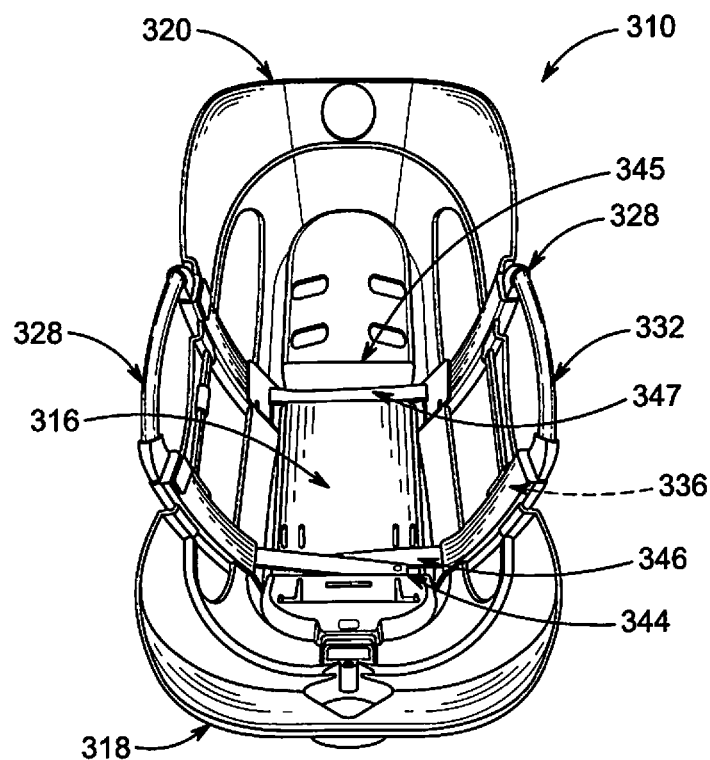
FIG. 22 is a perspective view of the infant excursion seat with cover panels removed to show that the first and second side-carry handles include extensible springs arranged in hollow regions.

Extensible foot-end grip tether 336 is arranged to interconnect lower end of hand grip and foot end 318 of seating bucket 312 as shown in FIGS. 20-22. Extensible foot-end grip tether 336 is arranged to extend through a tether-receiving aperture 342 formed in the seating bucket 312 for sliding movement therein during a mode change of the extensible foot-end grip tether 336 between a NORMAL CONTRACTED mode in which the extensible foot-end grip tether 336 is shortened to a first effective length to retain hand grip in the LOWERED STORAGE position in close proximity to foot end 318 of seating bucket 312 in the absence of an application of an upward tugging force to hand grip 332 by a caregiver that is sufficient by a caregiver that is to pull hand grip 332 relative to seating bucket 312 in a direction away from the LOWERED STORAGE position and a TEMPORARY EXTENDED mode in which the effective length of the extensible foot-end grip tether 336 is lengthened to a relatively longer second length in response to application of an upward tugging force to hand grip 332 by the caregiver that is sufficient to move a portion of the extensible foot-end grip tether 336 through the tether-receiving aperture 342 formed in the seating bucket 312 to cause the first hand grip 332 to move from the LOWERED STORAGE position relative to the seating bucket 312 in a direction away from seating bucket 312 to assume the RAISED BUCKET-CARRYING position.

A child restraint in accordance with the present disclosure includes an infant excursion seat 310 and a base (i.e. bucket support shell 13) as shown in FIG. 18. Infant excursion seat 310 comprises a seat bucket 312, a first side carry handle 328, and a second side carry handle 330 arranged opposite first side carry handle 328. Seat bucket 312 is formed to include a child-carrying region 316. First side carry handle 328 is coupled to a first lateral side 322 of seat bucket 312 while second side carry handle 330 is coupled to a second lateral side 324 of seat bucket 12. Both first and second side carry handles 328, 330 are retractable and can be changed from a LOWERED STORAGE position, as shown in FIG. 19, to an RAISED BUCKET-CARRYING position to transport a child, as shown in FIG. 18.

Figure 19:
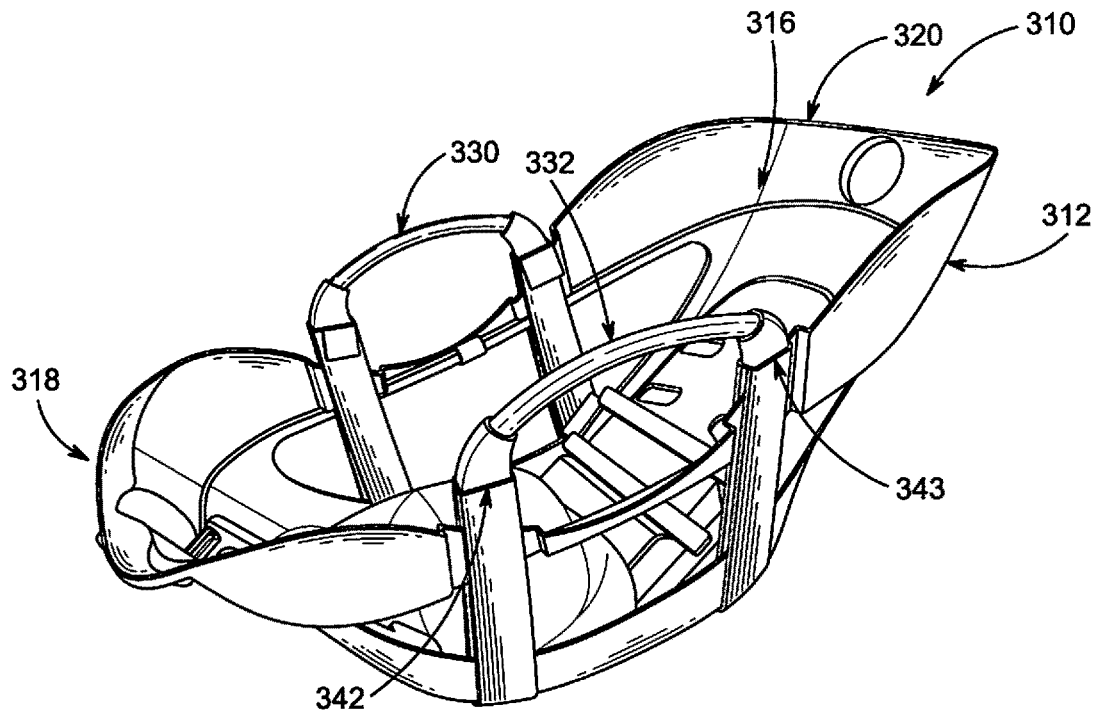
FIG. 19 is a perspective view of the infant excursion seat shown in FIG. 18 in which the first and second side-carry handles are arranged to lie in the LOWERED STORAGE position to establish a NORMAL CONTRACTED mode of the infant excursion seat.

In the LOWERED STORAGE position, a hand grip 332, 333 of first and second side carry handles 328, 330 is brought closer to seat bucket 312 to store first and second side carry handles 328, 330 out of interference with the child or the user as shown in FIG. 19. A user may grasp hand grip 332, 333 of first and second side carry handles 328, 330 and pull hand grips 332, 333 away from seat bucket 312 to carry and transport infant excursion seat 310 as suggested in FIG. 18.

Only first side carry handle is discussed below because first and second side carry handle 328, 330 are substantially similar. First side carry handle 328 includes a handle grip 332, a head end and foot end tether straps 334, 336, and a pair of extensible springs 346, 347 as shown in FIG. 20. Handle grip 332 are at least partially rigid and define hand grip 332 of side carry handle 328 that a user may grasp to carry the infant excursion seat 310. Head end and foot end tether straps 334, 336 are coupled to handle grip 332 and are bendable so that side carry handles 328, 332 may be brought together as shown in FIG. 18. Extensible springs 346, 347 are coupled to companion head end and foot end tether straps 334, 336 and are configured to bias handle grip 332 and Head end and foot end tether straps 334, 336 toward the LOWERED STORAGE position when infant excursion seat 310 is not being carried by the user. In the illustrative embodiment, extensible springs 346, 347 are stretchable straps, however, another suitable extensible spring such as, for example, a spring or rubber band may be used.

In the illustrative embodiment, handle grip 332 includes an inelastic core and a soft cover that wraps around the inelastic core to provide increased comfort for the user. The inelastic core provides support for handle grip 332 while the soft cover allows the user to carry infant excursion seat 310 using the user's hands or arms without causing uncomfortable pressure points. The inelastic core may comprise a polymeric material such as, for example, polypropylene. The soft cover may comprise a foam or rubber compound.

Seat bucket 312 is formed to include tether-receiving apertures 342, 343 as shown in FIGS. 18-23. Tether-receiving apertures 342, 343 are configured to receive head end and foot end tether straps 334, 336 and may be sized to apply a friction force on head end and foot end tether straps 334, 336 to regulate movement of head end and foot end tether straps 334, 336 as side carry handles 328, 330 change from the LOWERED STORAGE position to the expanded position.

Extensible springs 346, 347 are received within hollow regions 344, 345 and have attachment points on a side of seat bucket 312 opposite side carry handle 328 as shown in FIG. 21. When infant excursion seat 310 is fully assembled, extensible springs 346, 347 are positioned out of interference with the user and/or child within hollow regions 344, 345, respectively. As the user pulls handle grip 332, extensible springs 346, 347 stretch within hollow regions 344, 345 until side carry handles 328, 330 reach the expanded position. Infant excursion seat 310 may further include a detent structure to block further movement of side carry handles 328, 330 past the expanded position.

Figure 23:
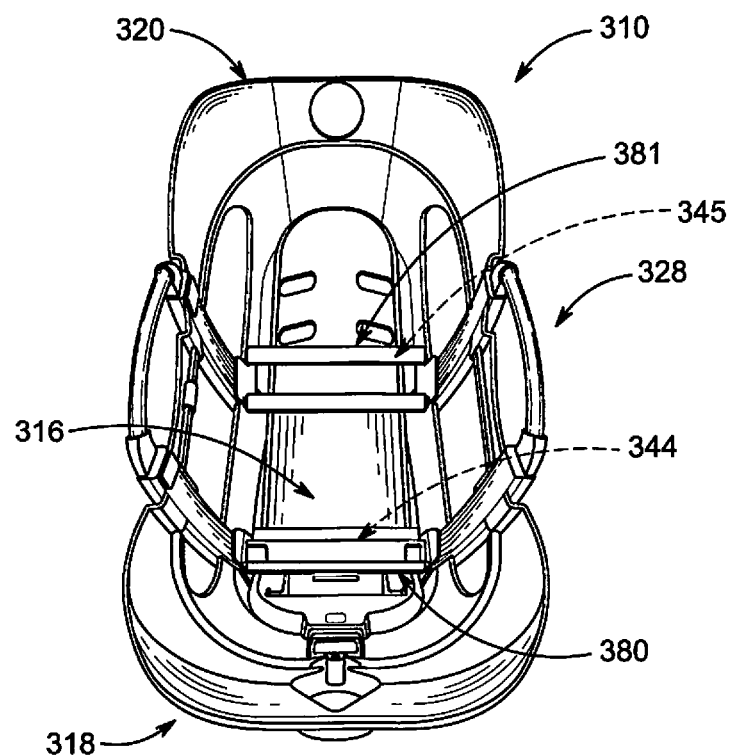
FIG. 23 is a perspective view of the infant excursion seat with cover panels installed to cover the extensible springs.

Infant excursion seat 310 further comprises channel covers 380, 381 as shown in FIGS. 21 and 23. Channel covers 380, 381 are inserted into child-carrying region 316 to cover and define hollow regions 344, 345. Hollow regions 344, 345 receive extensible springs 346, 347 and allow expansion and retraction of extensible springs 346, 347 therein. When channel covers 380, 381 are installed in infant excursion seat 310, channel covers 380, 381 cooperate with a bottom surface of seat bucket 12 to provide a generally flush and continuous surface in child-carrying region 18.

Figure 24:
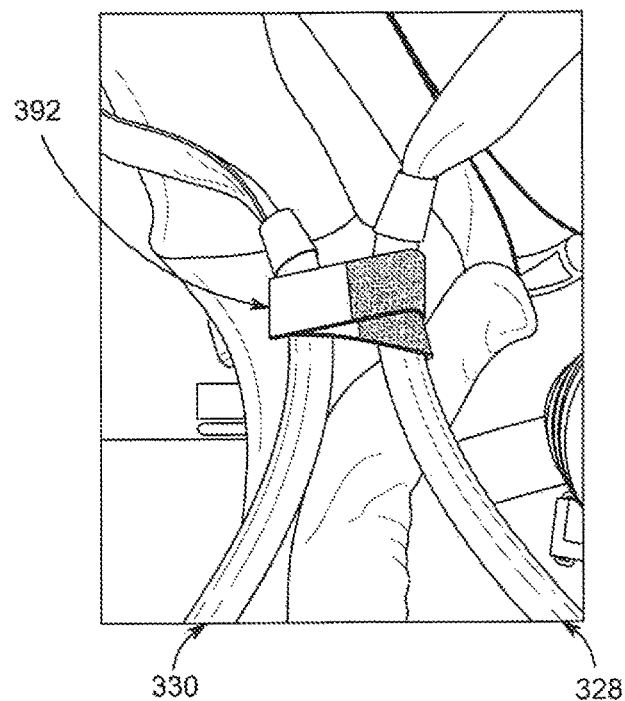
FIG. 24 is a perspective view of a first embodiment of a handle clip used in accordance with the present disclosure to retain the side carry handles together when they are in the RAISED BUCKET-CARRYING position.
Figure 25:
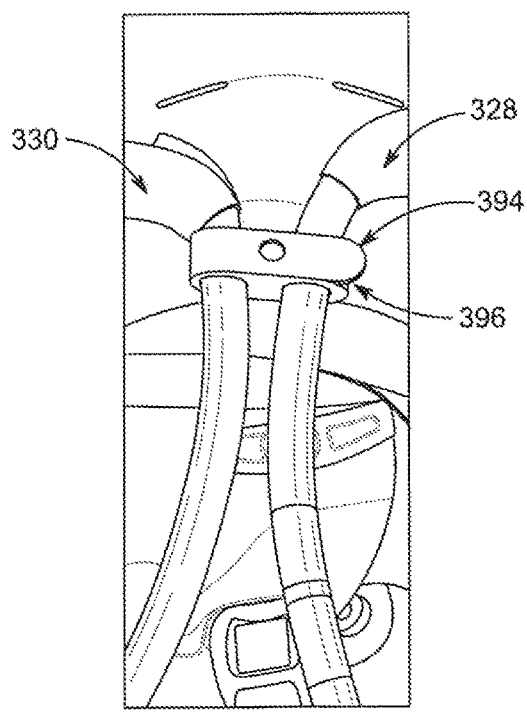
FIG. 25 is a perspective view of a second embodiment of a handle clip used in accordance with the present disclosure to retain the side carry handles together when they are in RAISED BUCKET-CARRYING position.

The infant excursion seat 310 may further comprise a flexible handle clip 392 or a rigid handle clip 394 as shown in FIGS. 24 and 25. Handle clips 392, 394 are configured to retain first and second side carry handles together above interior child-carrying region 316. Handle clip 392 is a strap that is wrapped around side carry handles and has fastening means such as VELCRO® to secure the strap and retain side carry handles together as shown in FIG. 24. Handle clip 394 is coupled to one of side carry handles and is pivotable relative to side carry handles. Handle clip 394 includes a hook feature 396 that is pivoted into engagement with the other of side carry handles by the user to retain side carry handles together as shown in FIG. 25. Handle clips 392, 394 may be included in infant excursion seats 10 and 210 in some embodiments.

The invention claimed is:

1. A child restraint comprising
an infant excursion seat including
a seating bucket formed to include an interior child-carrying space, the seating bucket including a foot end, an opposite head end, a first side wall extending between the foot and head ends, and a second side wall extending between the foot and head ends and lying in spaced-apart relation to the first side wall to locate the interior child-carrying space therebetween, and
a bucket carrier including a first side carry handle associated with the first side wall of the seating bucket and a second side carry handle associated with the second side wall of the seating bucket,
the first side carry handle comprising
a first hand grip arranged to be gripped and moved relative to the seating bucket by a person carrying the seating bucket from a lowered storage position located in close proximity to the foot end of the seating bucket to a raised bucket-carrying position located above a midsection of the first side wall and between the foot and head ends of the seating bucket, the first hand grip including an upper end facing toward the head end of the seating bucket and a lower end facing toward the foot end of the seating bucket,
a head-end grip tether arranged to interconnect the upper end of the first hand grip and the head end of the seating bucket, and
a foot-end grip tether including a movable strap segment having an anchored outer end coupled to the lower end of the first hand grip and passing through a tether-receiving aperture formed in the seating bucket, the foot-end handle tether further including extensible means located in a hollow region formed in the foot end of the seating bucket and coupled to the movable strap segment and to the foot end of the seating bucket for yieldably and automatically pulling the movable strap segment through the tether-receiving aperture formed in the seating bucket to move the first hand grip from the raised bucket-carrying position toward the foot end of the seating bucket to reach the lowered storage position alongside the foot end of the seating bucket in response to release of the first hand grip by a person transporting the seating bucket by holding the first hand grip in the raised bucket-carrying position so that the first hand grip normally remains in the lowered storage position until a caregiver moves the first hand grip upwardly relative to the seating bucket toward the raised bucket-carrying position.

2. The child restraint of claim 1, wherein the extensible means comprises an extensible spring that is coupled to the foot end of the seating bucket at a first anchor point and arranged to apply a pulling force to the movable strap segment normally to pull the movable strap segment through the tether-receiving aperture formed in the seating bucket to cause the hand grip that is coupled to the movable strap segment to move toward the seating bucket to assume the lowered storage position.

3. The child restraint of claim 2, wherein the extensible spring includes an inner end that is coupled to the movable strap segment and an outer end that is coupled to the foot end of the seating bucket at the first anchor point.

4. The child restraint of claim 2, wherein the foot end of the seating bucket includes an interior surface facing toward the interior child-carrying space and an exterior surface facing away from the interior child-carrying space and the first anchor point is located on the exterior surface to cause a portion of the extensible spring to extend along the exterior surface of the foot end of the seating bucket.

5. The child restraint of claim 2, wherein the extensible spring comprises an elastic strap having an inner end associated with the movable strap segment and an outer end coupled to the foot end of the seating bucket at the first anchor point.

6. The child restraint of claim 5, wherein the extensible spring further includes a movable slide mounted for back-and-forth movement on the movable strap segment and coupled to the elastic strap to lie at a first distance from the tether-receiving aperture formed in the seating bucket during elastic contraction of the elastic strap when the hand grip is in the lowered storage position and alternatively at a relatively shorter second distance from the tether-receiving aperture formed in the seating bucket during elastic expansion of the elastic strap when the hand grip is in the raised bucket-carrying position.

7. The child restraint of claim 6, wherein the foot end of the seating bucket includes an interior surface facing toward the interior child-carrying space and an exterior surface facing away from the interior child-carrying space and the movable slide and the elastic strap are arranged to move on and relative to the exterior surface of the foot end of the seating bucket during movement of the hand grip between the raised bucket-carrying position and the lowered storage position.

8. The child restraint of claim 5, wherein the extensible spring further comprises a movable slide formed to include a strap-segment receiver, the movable strap segment further includes an inner anchored end coupled to the foot-end of the seating bucket at a second anchor point that is separated from the first anchor point, the movable strap segment is arranged to extend through the strap-segment receiver for movement therein during movement of the hand grip between the raised bucket-carrying position and the lowered storage position, and the inner end of the elastic strap is coupled to the movable slide normally to apply a pulling force to the movable slide to cause the movable slide to move away from the tether-receiving aperture formed in the seating bucket and pull the movable strap segment through the strap-segment receiver of the movable slide to move the hand grip relative to the seating bucket to assume the lowered storage position.

9. The child restraint of claim 8, wherein the movable slide is arranged to occupy a temporary position to lie between the first and second anchor points and in close proximity to each of the second anchor point and the tether-receiving aperture formed in the seating bucket when the hand grip is moved by a caregiver relative to the seating bucket to assume the raised bucket-carrying position and alternatively to occupy a normal position after the caregiver has released the hand grip to allow the elastic strap to pull the movable slide away from the second anchor point in a direction toward the first anchor point to cause sufficient movement of the movable strap segment in the tether-receiving aperture formed in the seating bucket to draw the hand grip from the raised bucket-carrying position to the lowered storage position.

10. The child restraint of claim 8, wherein the foot end of the seating bucket includes an interior surface facing toward the interior child-carrying space and an exterior surface facing away from the interior child-carrying space and extending from the first side wall to the second side wall of the seating bucket, the movable slide and the elastic strap are arranged to move on and relative to the exterior surface of the foot end of the seating bucket during movement of the hand grip between the raised bucket-carrying position and the lowered storage position, the first anchor point associated with the outer end of the elastic strap is located in close proximity to the second side wall of the seating bucket, and the second anchor point associated with the inner end of the movable strap segment is located between the first anchor point and the tether-receiving aperture formed in the seating bucket.

11. The child restraint of claim 2, wherein the movable strap segment further includes an anchored inner end coupled to the foot end of the seating bucket and arranged to lie opposite to the outer anchored end and a middle portion arranged to interconnect the inner and outer anchored ends and to pass through the tether receiving aperture formed in the seating bucket and the extensible means is coupled at one end thereof to the middle portion of the movable strap segment and at another end thereof to the foot end of the seating bucket.

12. The child restraint of claim 11, wherein the seating bucket further includes a floor located between the first and second side walls and arranged to extend from the foot end to the opposite head end, the foot end of the seating bucket includes a concave panel arranged to extend from the first side wall to the second side wall and configured to include an inner proximal end coupled to the floor and an outer free end arranged to lie in spaced-apart relation to the floor to locate the inner proximal end therebetween, and the hollow region formed in the foot end of the seating bucket is located at the outer free end of the concave panel included in the foot end of the seating bucket.

13. The child restraint of claim 11, wherein the extensible means is coupled at the opposite end thereof to the foot end of the seating bucket at a first anchor point and the outer anchored end of the movable strap segment is coupled to the foot end of the seating bucket at a second anchor point that is arranged to lie in spaced-apart relation to the first anchor point.

14. The child restraint of claim 13, wherein the extensible means includes a movable slide formed to include a strap-segment receiver and a slide-mover strap having an outer end coupled to the foot end of the seating bucket at the first anchor point and an inner end coupled to the movable slide to locate the movable slide between the first anchor point and the tether-receiving aperture formed in the seating bucket, the middle portion of the movable strap segment is arranged to pass through the strap-segment receiver formed in the movable slide, and the slide-mover strap is made of an elastic material configured to move the movable slide away from the tether-receiving aperture formed in the seating bucket toward the first anchor point while applying a pulling force to the middle portion of the movable strap segment sufficient to move the middle portion of the movable strap segment in a first direction in the tether-receiving aperture formed in the seating bucket to move the hand grip relative to the seating bucket normally to assume the lowered storage position until a caregiver moves the hand grip upwardly way from the seating bucket to apply a tugging force to the middle portion of the movable strap segment that is opposite to and greater than the pulling force applied to the middle portion of the movable strap segment by the slide-mover strap of the extensible means so as to cause the middle portion of the movable strap segment to be moved in an opposite second direction in the tether-receiving aperture formed in the seating bucket.

15. The child restraint of claim 2, wherein the movable strap segment further includes an inner anchored end coupled to the foot end of the seating bucket at a first anchor point and a middle portion located between the inner and outer anchored ends and the extensible spring is coupled at one end to the middle portion of the movable strap segment and at an opposite end to the foot end of the seating bucket at the first anchor point.

16. The child restraint of claim 6, wherein the extensible spring is stretched to lie along and in side-by-side relation to a section of the movable strap segment when the hand grip occupies the raised bucket-carrying position and is unstretched to disengage portions of the section and form a free loop when the hand grip occupies the lowered storage position.

17. The child restraint of claim 6, wherein the seating bucket further includes a floor located between the first and second side walls and arranged to extend from the foot end to the opposite head end, the foot end of the seating bucket includes a concave panel arranged to extend from the first side wall to the second side wall and configured to include an inner proximal end coupled to the floor and an outer free end arranged to lie in spaced-apart relation to the floor to locate the inner proximal end therebetween, and the hollow region formed in the foot end of the seating bucket is located at the outer free end of the concave panel included in the foot end of the seating bucket.

18. The child restraint of claim 2, wherein the movable strap segment further includes an inner end and an opposite outer end anchored to the hand grip and the extensible spring is coupled at one end to the inner end of the movable strap segment and at another end to the foot end of the seating bucket.

19. The child restraint of claim 18, wherein the seating bucket further includes a floor located between the first and second side walls and arranged to extend from the foot end to the opposite head end, the foot end of the seating bucket includes a concave panel arranged to extend from the first side wall to the second side wall and configured to include an inner proximal end coupled to the floor and an outer free end arranged to lie in spaced-apart relation to the floor to locate the inner proximal end therebetween, and a portion of the extensible spring is arranged to extend along the inner proximal end of the concave panel included in the seating bucket in close proximity to the floor and in spaced-apart relation to the outer free end of the concave panel.

20. A child restraint comprising an infant excursion seat including a seating bucket formed to include an interior child-carrying space, the seating bucket including a foot end, an opposite head end, a first side wall extending between the foot and head ends, and a second side wall extending between the foot and head ends and lying in spaced-apart relation to the first side wall to locate the interior child-carrying space therebetween, and a bucket carrier including a first side carry handle associated with the first side wall of the seating bucket and a second side carry handle associated with the second side wall of the seating bucket, the first side carry handle comprising a first hand grip arranged to be gripped and moved relative to the seating bucket by a person carrying the seating bucket from a lowered storage position located in close proximity to the foot end of the seating bucket to a raised bucket-carrying position located above a mid-section of the first side wall and between the foot and head ends of the seating bucket, the first hand grip including an upper end facing toward the head end of the seating bucket and a lower end facing toward the foot end of the seating bucket, a head-end grip tether arranged to interconnect the upper end of the first hand grip and the head end of the seating bucket, and a foot-end grip tether including a movable strap segment having an anchored outer end coupled to the lower end of the first hand grip and passing through a tether-receiving aperture formed in the seating bucket, the foot-end handle tether further including extensible means coupled to the movable strap segment and to the seating bucket for yieldably and automatically pulling the movable strap segment through the tether-receiving aperture formed in the seating bucket to move the first hand grip from the raised bucket-carrying position toward the foot end of the seating bucket to reach the lowered storage position alongside the foot end of the seating bucket without pulling the extensible means through the tether-receiving aperture formed in the seating bucket in response to release of the first hand grip by a person transporting the seating bucket by holding the first hand grip in the raised bucket-carrying position so that the first hand grip normally remains in the lowered storage position until a caregiver moves the first hand grip upwardly relative to the seating bucket toward the raised bucket-carrying position.

21. A child restraint comprising an infant excursion seat including a seating bucket formed to include an interior child-carrying space, the seating bucket including a foot end, an opposite head end, a first side wall extending between the foot and head ends, and a second side wall extending between the foot and head ends and lying in spaced-apart relation to the first side wall to locate the interior child-carrying space therebetween, and a bucket carrier including a first side carry handle associated with the first side wall of the seating bucket and a second side carry handle associated with the second side wall of the seating bucket, the first side carry handle comprising a first grip handle arranged to be gripped and moved relative to the seating bucket by a person carrying the seating bucket from a lowered storage position located in close proximity to the foot end of the seating bucket to a raised bucket-carrying position located above a mid-section of the first side wall and between the foot and head ends of the seating bucket, the first hand grip including an upper end facing toward the head end of the seating bucket and a lower end facing toward the foot end of the seating bucket, a head-end grip tether arranged to interconnect the upper end of the first hand grip and the head end of the seating bucket, and an extensible foot-end grip tether arranged to interconnect the lower end of the first hand grip and the foot end of the seating bucket and arranged extend through a tether-receiving aperture formed in the seating bucket for sliding movement therein during a mode change of the extensible foot-end grip tether between a normal contracted mode in which the extensible foot-end grip tether is shortened to a first effective length to retain the first hand grip in the lowered storage position in close proximity to the foot end of the seating bucket in the absence of an application of an upward tugging force to the first hand grip sufficient to pull the first hand grip relative to the seating bucket in a direction away from the lowered storage position and a temporary extended mode in which the effective length of the extensible foot-end grip tether is lengthened to a relatively longer second length in response to application of an upward tugging force to the first hand grip that is sufficient to move a portion of the extensible foot-end grip tether through the tether-receiving aperture formed in the seating bucket to cause the first hand grip to move from the lowered storage position relative to the seating bucket in a direction away from the seating bucket to assume the raised bucket-carrying position.

* * * * *